(12) United States Patent
Denton et al.

(10) Patent No.: US 10,940,437 B2
(45) Date of Patent: Mar. 9, 2021

(54) ADVANCED TRITIUM SYSTEM AND ADVANCED PERMEATION SYSTEM FOR SEPARATION OF TRITIUM FROM RADIOACTIVE WASTES

(71) Applicant: Veolia Nuclear Solutions, Inc., Westminster, CO (US)

(72) Inventors: Mark S. Denton, Knoxville, TN (US); Gaetan Bonhomme, Los Angeles, CA (US); Wesley L. Bratton, Richland, WA (US); Nicephore Bonnet, Paris (FR)

(73) Assignee: Veolia Nuclear Solutions, Inc., Westminster, CO (US)

( * ) Notice: Subject to any disclaimer, the term of this patent is extended or adjusted under 35 U.S.C. 154(b) by 0 days.

(21) Appl. No.: 15/171,183

(22) Filed: Jun. 2, 2016

(65) Prior Publication Data
US 2016/0310898 A1    Oct. 27, 2016

Related U.S. Application Data

(63) Continuation-in-part of application No. 13/863,206, filed on Apr. 15, 2013, now abandoned, which is a
(Continued)

(51) Int. Cl.
*B01D 59/50* (2006.01)
*B01D 59/32* (2006.01)
(Continued)

(52) U.S. Cl.
CPC ............ *B01D 59/50* (2013.01); *B01D 59/12* (2013.01); *B01D 59/30* (2013.01); *B01D 59/32* (2013.01);
(Continued)

(58) Field of Classification Search
None
See application file for complete search history.

(56) References Cited

U.S. PATENT DOCUMENTS 3,407,571 A    10/1968  Sherwood
3,974,048 A     8/1976  Hammerli et al.
(Continued)

FOREIGN PATENT DOCUMENTS

CA       907292         8/1972
EP    1736439 A2    12/2006
(Continued)

OTHER PUBLICATIONS

Son, S-H et al., "Tritium production, remcovery and application in Korea", Applied Raidation and Isotopes, Elsevier, Oxform, GB, vol. 67, No. 7-8, Jul. 1, 2009 (Jul. 1, 2009), pp. 1336-1340.
(Continued)

*Primary Examiner* — Melissa S Swain
(74) *Attorney, Agent, or Firm* — Holland & Hart, LLP

(57) ABSTRACT

A liquid phase catalytic exchange column with a catalyst is configured to receive hydrogen gas. The system uses the catalyst to exchange the hydrogen gas with the tritiated source yielding HT gas and tritiated water. The system monitors tritium content of the tritiated water. When a predetermined tritium level is detected, the tritiated water is released. The system also includes a gaseous permeation system comprising a permeable barrier for the selective extraction of gases.

29 Claims, 25 Drawing Sheets

Related U.S. Application Data continuation-in-part of application No. 13/079,331, filed on Apr. 4, 2011, now abandoned.

(60) Provisional application No. 61/320,515, filed on Apr. 2, 2010, provisional application No. 62/239,660, filed on Oct. 9, 2015.

(51) Int. Cl.

| | | |
|---|---|---|
| *B01D 59/30* | (2006.01) | |
| *C02F 1/461* | (2006.01) | |
| *C02F 1/72* | (2006.01) | |
| *B01D 59/40* | (2006.01) | |
| *B01D 59/12* | (2006.01) | |
| *G21F 9/12* | (2006.01) | |
| *G21F 9/02* | (2006.01) | |
| *C01B 4/00* | (2006.01) | |
| *C01B 5/00* | (2006.01) | |
| *G21F 9/06* | (2006.01) | |
| *C02F 1/467* | (2006.01) | |
| *C02F 101/00* | (2006.01) | |
| *C02F 103/18* | (2006.01) | |
| *G21G 1/00* | (2006.01) | |
| *C02F 1/42* | (2006.01) | |

(52) U.S. Cl.
CPC ............... *B01D 59/40* (2013.01); *C01B 4/00* (2013.01); *C01B 5/00* (2013.01); *C02F 1/461* (2013.01); *C02F 1/4672* (2013.01); *C02F 1/725* (2013.01); *G21F 9/02* (2013.01); *G21F 9/06* (2013.01); *G21F 9/12* (2013.01); *B01D 2255/102* (2013.01); *C02F 1/42* (2013.01); *C02F 1/46104* (2013.01); *C02F 2001/46142* (2013.01); *C02F 2101/006* (2013.01); *C02F 2103/18* (2013.01); *C02F 2201/46115* (2013.01); *C02F 2201/46195* (2013.01); *C02F 2209/001* (2013.01); *G21G 1/001* (2013.01); *G21G 2001/0094* (2013.01)

(56) References Cited

U.S. PATENT DOCUMENTS

| | | | |
|---|---|---|---|
| 4,190,515 A | 2/1980 | Butler | |
| 4,494,965 A | 1/1985 | Ali-Khan | |
| 5,080,693 A | 1/1992 | Bourne | |
| 5,468,462 A | 11/1995 | Miller et al. | |
| 5,645,518 A | 7/1997 | Wagh | |
| 5,994,608 A | 11/1999 | Pal | |
| 6,332,914 B1 | 12/2001 | Lee | |
| 6,348,153 B1 | 2/2002 | Patterson | |
| 7,815,890 B2 * | 10/2010 | Busigin ................ | B01D 59/12 423/647.7 |
| 8,148,594 B2 | 4/2012 | Denton | |
| 2002/0141916 A1 | 10/2002 | Graham | |
| 2004/0100379 A1 * | 5/2004 | Boman ................ | G06Q 10/047 340/539.26 |
| 2007/0246344 A1 * | 10/2007 | Bonnett ................ | B01D 59/04 203/5 |
| 2010/0239481 A1 | 9/2010 | Busigin | |
| 2011/0243834 A1 | 10/2011 | Denton | |
| 2013/0254273 A1 | 9/2013 | Denton | |
| 2013/0336870 A1 | 12/2013 | Denton | |
| 2014/0356270 A1 * | 12/2014 | Shmayda ................ | C01B 4/00 423/249 |
| 2015/0368136 A1 | 12/2015 | Raymont | |
| 2016/0233001 A1 | 8/2016 | Koyanaka | |

FOREIGN PATENT DOCUMENTS

| | | |
|---|---|---|
| JP | S53-126497 A | 11/1978 |
| JP | S55-002941 A | 1/1980 |
| JP | S61-046226 A | 1/1988 |
| JP | 2009-121939 A | 6/2009 |
| WO | 2011/243834 | 12/2011 |
| WO | 2014/172360 A2 | 10/2014 |
| WO | WO 2015/072981 | 5/2015 |

OTHER PUBLICATIONS

Ionita, G. et al, "An assessment on hydrogen isotopes separation by liquid phase catalytic exchange process", Journal o fRadioanalytical and Nucleaqr chemistry, Jul. 2015, vol. 305, Issue 1, pp. 117-126, Apr. 28, 2015 (Apr. 8, 2015), pp. 117-126, XP055335410.
European Patent Office, "Extended Search Report", App. No. 16189066. 0, dated Jan. 23, 2017, 11 pages.
Kalyanam and Sood, "Fusion Technology" 1988, pp. 525-528.
Yoshida et al., "Fusion Eng. and Design" 1998, pp. 825-882.
Busigin et al., "Fusion Technology" 1995 pp. 1312-1316.
A. Busigin and S.K. Sood, "Fusion Technology" 1995 pp. 544-549.
M. Benedict, T. Pigford and H. Levi, "Nuclear Chemical Engineering", McGraw Hill (1981).
G. Vasaru et al., "The Thermal Diffusion Column", VEB Deutscher der Wissenschaften, Berlin, 1968.
A. Busigin and P. Gierszewski, "Fusion Engineering and Design" 1998 pp. 909-914.
D.K. Murdoch et al., "Fusion Science and Technology" 2005, pp. 3-10.
K.L. Sessions, "Fusion Science and Technology" 2005, 91-96.
J. Cristescu et al., "Fusion Science and Technology" 2005, pp. 97-101, 343-348.
D.L. Luo et al., "Fusion Science and Technology" 2005, pp. 156-158.
R. Clark Jones and W.H. Furry, "Reviews of Modern Physics", 1946, pp. 151-224.
Vagner, "Preparation of Hydrophobic Pt-Catalysts Used for Nuclear Effluents Decontamination".
Ortman et al., "Tritium Processing at the Savannah River Site: Present and Future," J. Vaac. Sci. Technol., A8, 3, 2881.
Shimizu et al., "Hydrogen Isotope Enrichment by Hydrophobic Pt-Catalyst in Japan and Western Countries" Proceedings International Symposium on Isotope Separation and Chemical Exchange Uranium Enrichment, Tokyo, Japan 1990.
Fiek et al., "Tritium Enrichment by Isotope Exchange between Hydrogen and Water Using a Hydrophobic Catalyst for nuclear Fuel Reprocessing", Chem. Eng. Tech. 52, 1980.
Asakura et al., "Deuterium Exchange between Water Mists and Hydrogen Gas in a Hydrophobic Catalyst Bed", Nucl. Sci. Eng. 79, 1981.
Belapurkar et al., "PTFE Dispersed Hydrophobic Catalysts for Hydrogen-Water Isotopic Exchange", Appl. Cat. 43, 1988.
Ionita et al., "The Separation of Deuterium and Tritium on Pt/SDBC/ PS and Pt/C/PTFE Hydrophobic Catalysts" Fus. Tech., 28, 1995.
Proceedings of the International Conference Nuclear Energy for New Europe, Protoroz, Slovenia, Sep. 8-11, 2008. http://www.nss. si/proc/port2008/.
Butler et al., "Novel Catalyst for Isotopic Exchange between Hydrogen and Liquid Water" ACS Symp. 1978, Series 68.
I. Balasanian, Concentration and characterization of catalyst for chemical industry (in Romanian), I.P. Iasi, 1987.
Swartz et al., "Fuel Processing Catalysts Based on nanoscale Ceria", Fuel Cells Bulletin, 30, 2001.
Korotkikh et al., "Selective catalytic oxidation do CO in H2: fuel cell applications", Catal. Today, 62, 2000.
Popescu et al., "Preparation of hydrophobic Pt-catalysts for tritium removal from nuclear effluents", Journal of Int. Res. Pub., vol. 1, Issue Ecology, 2006, ISSN 1311-8978.
Chuang et al., "Development of Wet proofed Catalyst Recombiner for Removal of Airborne Tritium", Appl. Cat. 30, 1987.
Ionita et al., Patent RSR 147684/1994 "Preparation method for hydrophobic catalysts" in Romanian.
Huang et al., Hydrophobic platinum-polytetrafluoroethylene catalyst for hydrogen isotope separation, International Journal of Hydrogen Engery, 2010, vol. 35, pp. 6103-6112. Abstract: Fig. 4; Fig 5.

(56) References Cited

OTHER PUBLICATIONS

Iaea, "Management of Waste Containing Tritium and Carbon-14"; Technical Reports Series No. 421; http://www-pub.iaea.org/MTCD/publications/PDF/TRS421_web.pdf, Jun. 1996 on Jul. 2011; 120 pages.

Drake, Robert H., "Recovery of Tritium from Tritiated Waste Water Cost-Effectiveness Analysis" Jun. 1996, http://www.fas.org/spg/othergov/doe/lan/llb-www/la-pubs/000326809.pdf 12 pages.

* cited by examiner

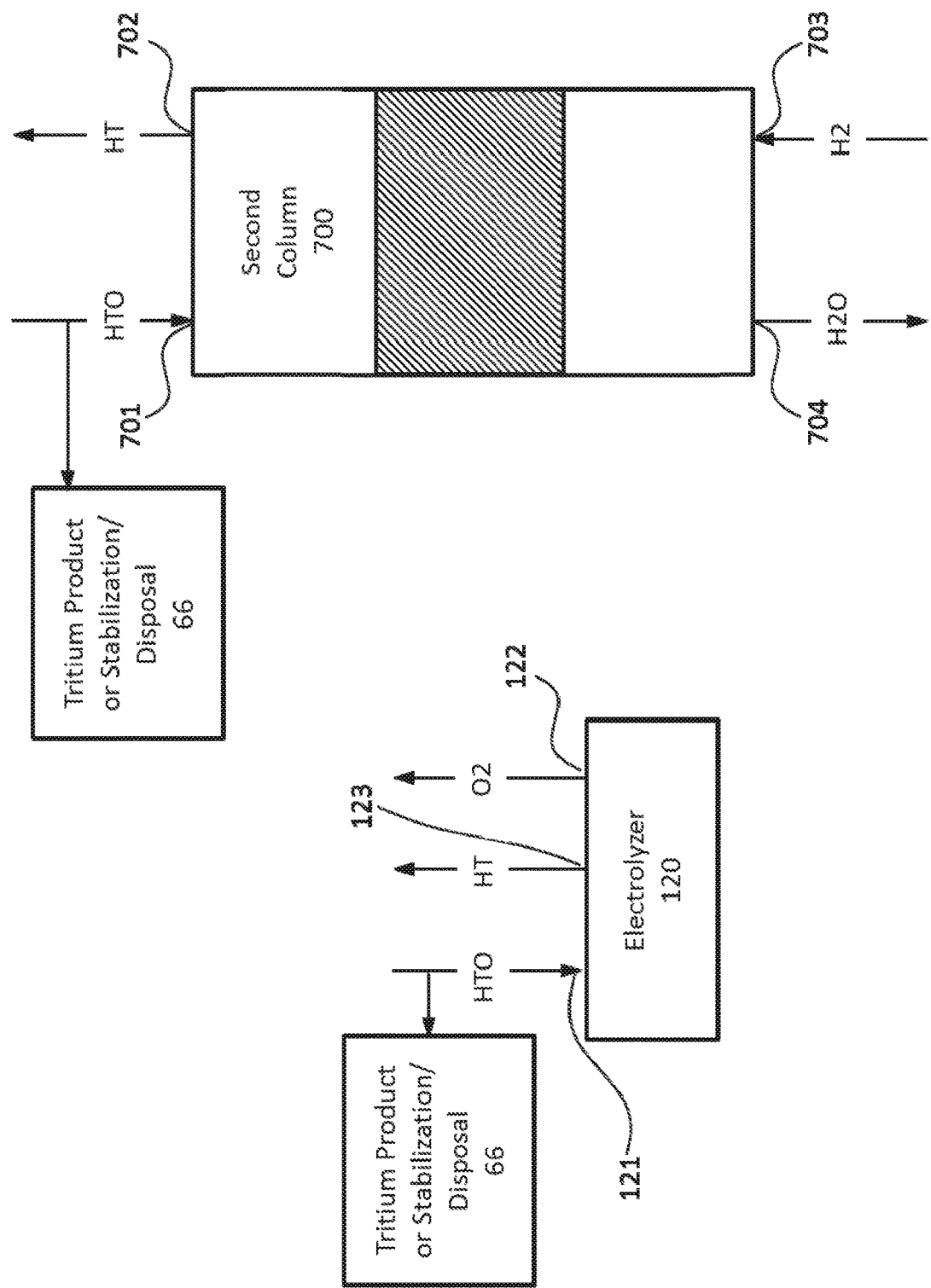

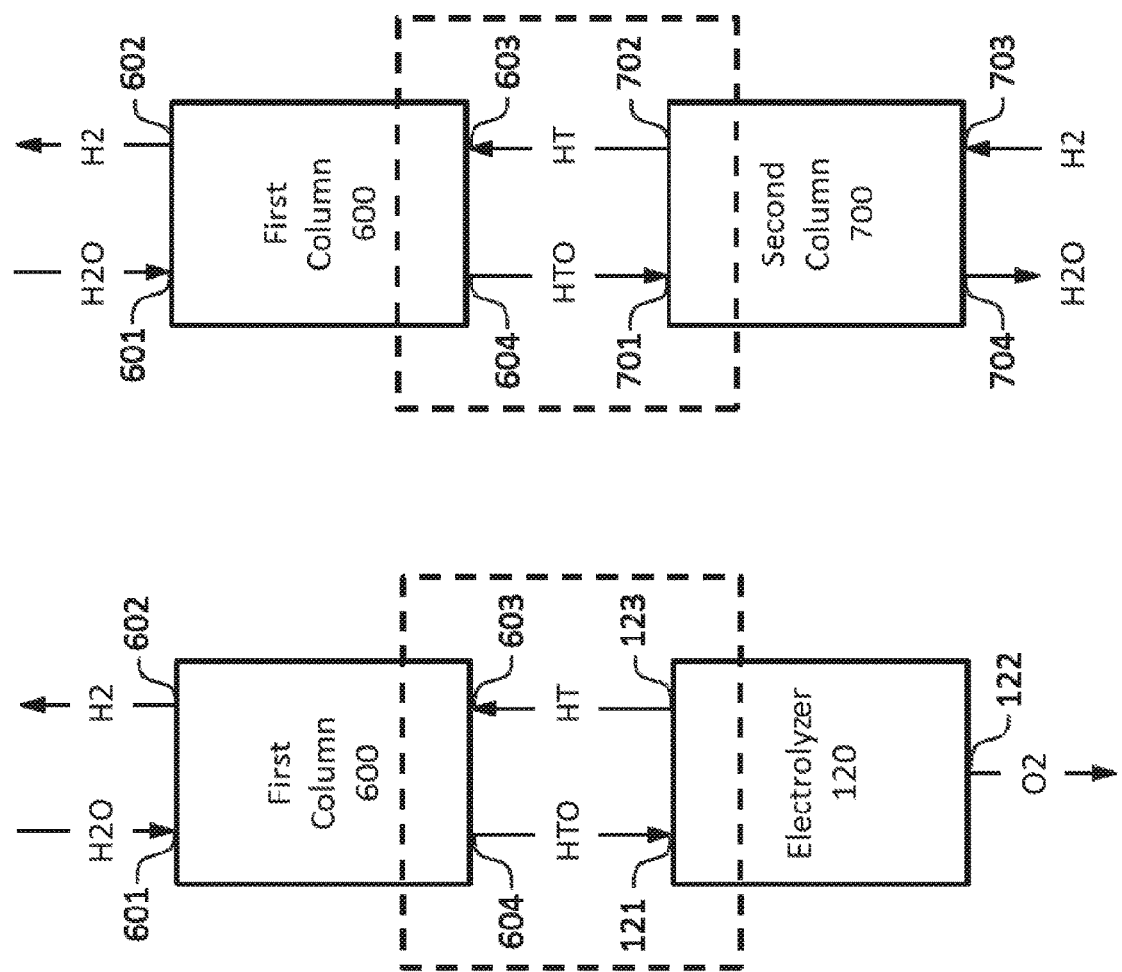
FIG. 11C
FIG. 11B
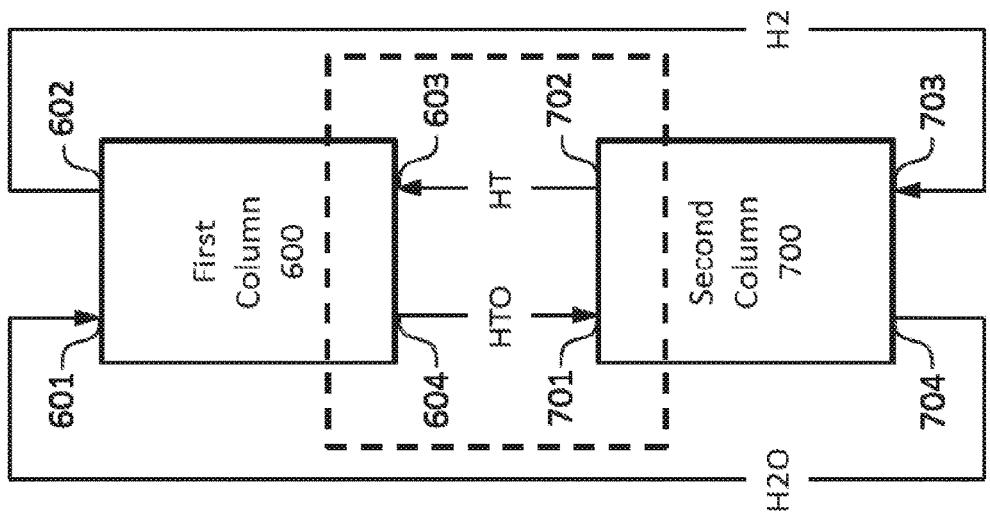
FIG. 11A

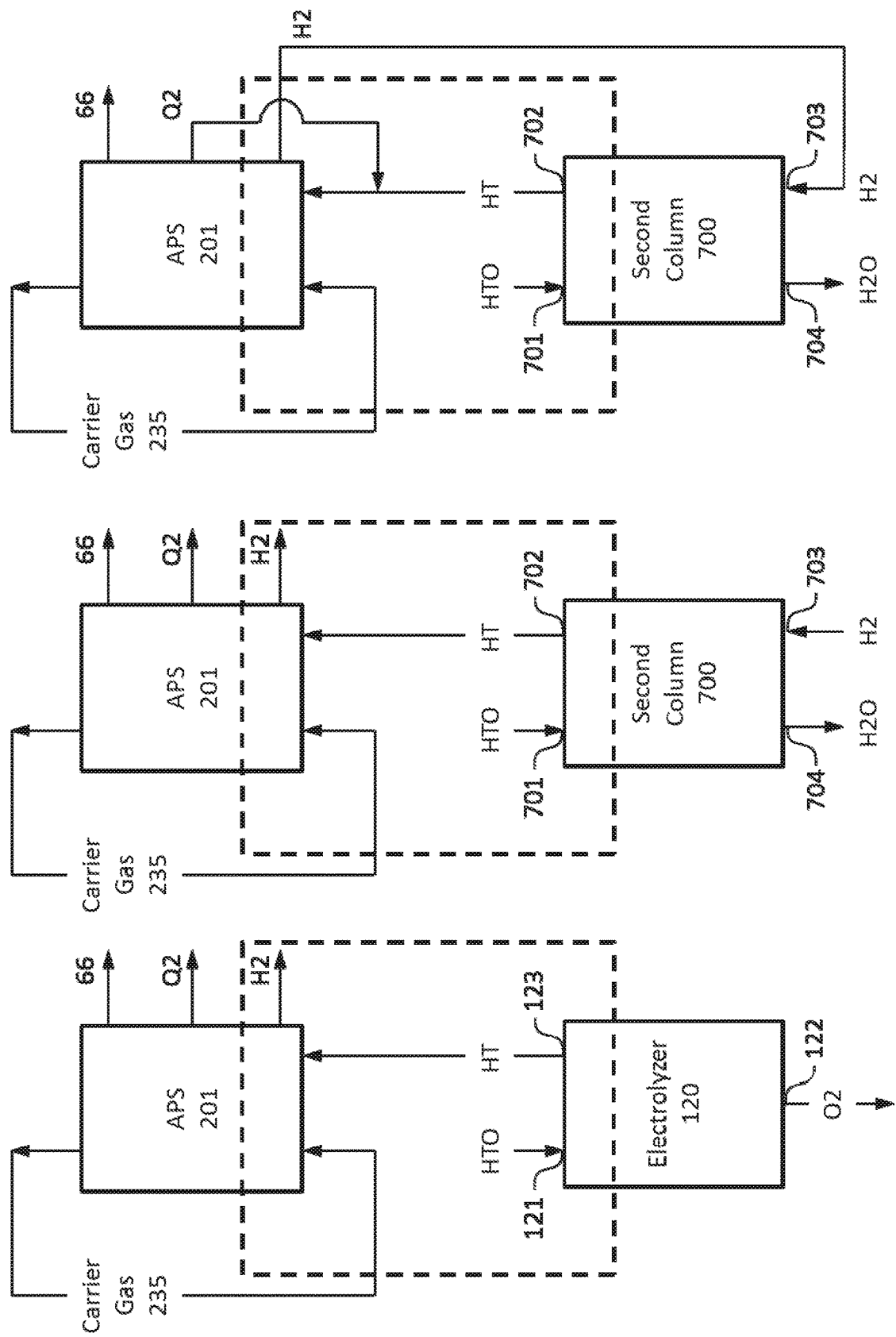

ADVANCED TRITIUM SYSTEM AND ADVANCED PERMEATION SYSTEM FOR SEPARATION OF TRITIUM FROM RADIOACTIVE WASTES

CROSS-REFERENCE TO RELATED APPLICATIONS

This application is a continuation-in-part of U.S. application Ser. No. 13/863,206, filed Apr. 15, 2013; which is a continuation-in-part of U.S. application Ser. No. 13/079,331, filed Apr. 4, 2011, which claims the benefit under 35 U.S.C. section 119(e) of U.S. provisional application 61/320,515, filed Apr. 2, 2010, all of which are herein incorporated by reference in their entirety.

This application claims priority to U.S. provisional application 62/239,660, filed Oct. 9, 2015 which is herein incorporated by reference in its entirety.

U.S. application Ser. No. 14/748,535, filed Jun. 24, 2015, titled MOBILE PROCESSING SYSTEM FOR HAZARDOUS AND RADIOACTIVE ISOTOPE REMOVAL is hereby incorporated by reference in its entirety.

BACKGROUND OF THE INVENTION

1. Technical Field of Invention

The present invention relates generally to the treatment of radioactive waste and in particular to the separation, extraction, and disposition of tritium from radioactive waste materials in a modular, scalable, and extensible system termed a Tritium Remediation System, hereinafter referred to as TRS.

2. Description of the Related Art

Tritium is a radioactive isotope of hydrogen with a half-life of approximately 12.3 years. As tritium is both a radioactive contaminant and a potentially useful material for numerous scientific and commercial applications, the generation of tritium in pressurized water reactors (PWRs) is a matter of vital interest. Normal reactor operations produce quantities of tritiated water (HTO). In particular, the use of boron as a moderator within reactor systems naturally leads to the production of tritium and to the presence of tritium-containing water molecules both within the water used for cooling the reactor and within water used in storage pools for radioactive waste materials.

However, in addition to normal reactor operations, there can, and have been, significant nuclear events over the years including Chernobyl, Three Mile Island, and the Fukushima Daiichi nuclear disaster. The nuclear disaster at the Fukushima I Nuclear Power Plant began on 11 Mar. 2011 and resulted in a nuclear meltdown of three of the plant's six nuclear reactors.

The failure occurred when the plant was hit by a tsunami that had been triggered by the magnitude 9.0 Tōhoku earthquake. The following day, 12 March, substantial amounts of radioactive material began to be released, creating the largest nuclear incident since the Chernobyl disaster in April 1986 and the largest (after Chernobyl) to measure Level 7 on the International Nuclear Event Scale (initially releasing an estimated 10-30% of the earlier incident's radiation). In an August 2013 press release, it was stated that the significant amount of radioactive water stored at the site awaiting clean-up was among the most pressing problems affecting the cleanup process, which is expected to take decades. There have been continued spills of contaminated water at the plant and some into the sea. Plant workers are trying to reduce the accumulation of contaminated water using measures, such as building an underground ice wall to reduce inflow, but they have not yet improved the situation significantly.

Available public water treatment processes remove many radioactive contaminants but are ineffective for tritium. Tritium is one of several radioactive isotopes that, over time, concentrate in organic systems and enter the food chain, possibly with adverse environmental and public health effects. Tritium contamination of the groundwater in the vicinity of nuclear power stations, and particularly at the Fukushima site, demand new approaches to tritium extraction processes. To date the focus has been on the extraction and production of high purity tritium. Many of the existing practices do not lend themselves to scalable processes, let alone ones for tritium extraction for the single purpose of disposal. It would be advantageous to have methods, systems, and apparatuses for the separation and removal of tritium from liquids such as the radioactive waste materials from the Fukushima Site. The capability to separate tritium from reactor water and radioactive waste materials is critical for clean, safe, and secure radioactive waste management; which in turn is important for the safe and cost-effective use of nuclear power.

The related art mainly discloses three types of hydrophobic catalysts used in the liquid phase catalytic exchange process, including a Pt/C/inert carrier (Pt/C/IC), a Pt/C/polytetra-fluoro-ethylene (Pt/C/PTFE), and a Pt/styrene-divinylbenzene copolymer (Pt/SDB). The Pt/C/IC has high strength, good chemical stability, and strong activity while at the same time having a complex forming technique. The size and shape of the Pt/C/PTFE molecules are easily controlled whereas the utilization ratio of Platinum Group Metal (PGM) is low. The Pt/SDB has good activity yet it shows low strength and small particle size.

CECE extraction of hydrogen isotopes through catalytic exchange has been well known in the art of tritium extraction. Additional related art discloses wet proofing the catalyst for use in Liquid Phase Catalytic Exchange. Below is an example of an underlying exchange reaction:

$$HT + H_2O \leftrightarrow HTO + H_2 \qquad (1)$$

It has also been disclosed that different hydrogen isotope concentrations, different temperatures, and different pressures yield differing and predictable separation factors. Additional art discloses that depending on the physico-chemical form of tritium at the start of the chemical exchange reaction three reactions are possible:

$$HT(g) + H_2O(l) \leftrightarrow H_2(g) + HTO(l) \text{ (Forward reaction)} \qquad (2)$$

$$HTO(v) + H_2(g) \leftrightarrow H_2O(v) + HT(g) \text{ (Reverse reaction)} \qquad (3)$$

$$HTO(l) + H_2(g) \leftrightarrow H_2O(l) + HT(g) \qquad (4)$$

where (g), (v), and (l) are indicative of phases gas, vapor, and liquid.

Regardless of the exchange reaction identified above (e.g. equation (4) and equation (2)), it was clearly understood and known in the art there were multiple possible outcomes of a catalyzed reaction in the presence of a hydrophobic catalyst when the conditions including temperature, concentrations, flow rates, and pressures are set to optimize one of the desired reactions above (2), (3), or (4) within the LPCE column. However, what the related art did not anticipate is a combination of LPCE columns operative at different temperatures, pressures, concentrations, and flow rates as a viable solution for the continuous extraction of tritium. Nor does the related art disclose is a modular approach to a field deployable Tritium Remediation System (TRS) and methods for using a mixed bed catalytic exchange process in a Liquid Phase Catalytic Exchange/Closed Loop Continuous Process (LPCE/CLCP) system, that operates as a low temperature and low pressure continuous balanced process, designed to rapidly extract and isolate isotope specific products without generating unwanted products in the form of new waste streams.

What is needed is a modular, scalable, cost-effective tritium extraction system, designed specifically for a remediation mission rather than for purity. Further, the ability to rapidly deploy and configure for a particular mission is advantageous.

So as to reduce the complexity and length of the Detailed Specification, and to fully establish the state of the art in certain areas of technology, Applicant(s) herein expressly incorporate(s) by reference all of the following materials identified in each numbered paragraph below.

Mobile Processing System for Hazardous and Radioactive Isotope Removal, Ser. No. 14/748,535 filed Jun. 24, 2015, with a priority date of Jun. 24, 2014, which is herein incorporated by reference in its entirety.

Balanced Closed Loop Continuous Extraction Process for Hydrogen Isotopes, Ser. No. 14/294,033 filed Jun. 2, 2014, with a priority date of May 31, 2013, which is herein incorporated by reference in its entirety.

Low-Energy Electrochemical Separation of Isotopes, Ser. No. PCT/CA2014/000293 filed Mar. 28, 2014, with a priority date of Mar. 29, 2013, which is herein incorporated by reference in its entirety.

Advanced Tritium System and Advanced Permeation System for Separation of Tritium from Radioactive Wastes and Reactor Water in Light Water Systems, Ser. No. 62/239,660 filed Oct. 9, 2015, which is herein incorporated by reference in its entirety.

Applicant believes that some of the above-incorporated material constitutes "essential material" within the meaning of 37 CFR 1.57(c)(1)-(3), applicants have amended the specification to expressly recite the essential material that has been incorporated by reference as allowed by the applicable rules.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 10A depicts the inputs and outputs of an electrolyzer.

FIG. 10B depicts the inputs and outputs of a second column.

FIG. 11A depicts the inputs and outputs of the system of FIG. 8.

FIG. 11B depicts the system of FIG. 11A where the electrolyzer has been replaced by a second column.

FIG. 11C depicts the closed loop relationship between a first column and a second column.

FIG. 16A depicts the system of FIG. 8 where the first column is replaced by an APS module.

FIG. 16B depicts the system of FIG. 16A where the electrolyzer is replaced with a second column.

FIG. 16C depicts the system of FIG. 16B where the outputs of the APS module may be returned as inputs to the second column.

Figure 1:
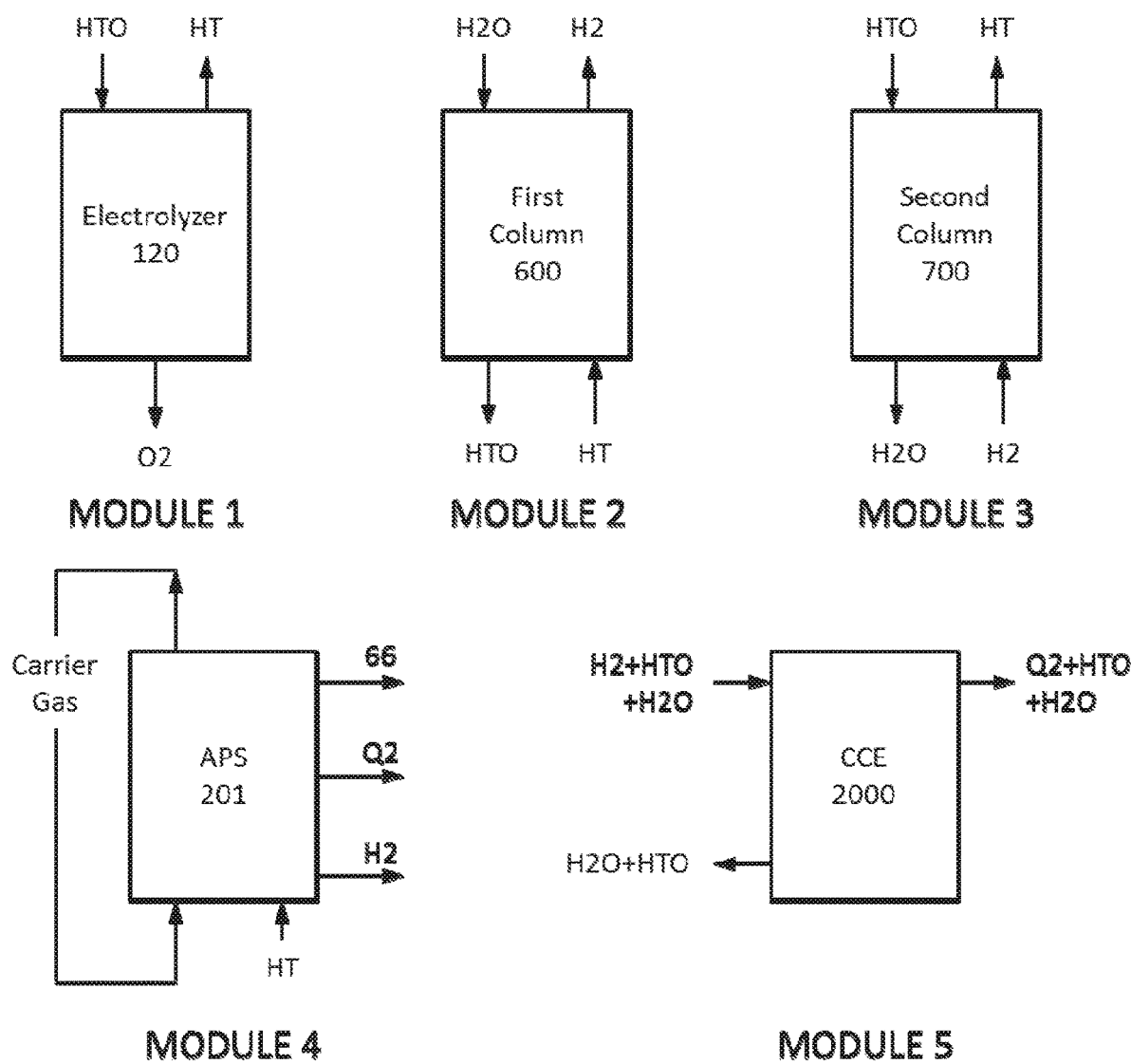
FIG. 1 depicts five different tritium separation modules.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software.

It should be noted that there are many different and alternative configurations, devices and technologies to which the disclosed inventions may be applied. The full scope of the inventions is not limited to the examples that are described below. In the following examples of the embodiments, references are made to the various embodiments in which the invention may be practiced. It is to be understood that other embodiments may be utilized and structural and functional changes may be made without departing from the scope of the invention.

Disclosed herein are systems, methods, and apparatuses for separating tritium from radioactive waste materials and waste water from nuclear reactors. In particular, the present general inventive concept, in some of its several embodiments, includes highly mobile and modular reconfigurable systems and processes for the high throughput and treatment of contaminated water for the concentration, separation, and safe disposition of tritium contaminated waste streams. Modularity allows for optimal configurations based upon site conditions and water concentration levels.

Of particular interest here is the development of a high throughput, low concentration system for volume reduction purposes, as opposed to a low throughput, high concentration, and high purity systems for tritium product generation. The systems taught herein include a combination of systems that are known and understood in the art of tritium extraction—the novel aspects are the balanced combination of technologies used in a relatively closed loop approach, these modules include:

Electrolyzer;
A first Liquid Phase Catalytic Exchange (LPCE) column;
A second Liquid Phase Catalytic Exchange (LPCE) column;
An advanced permeation system (APS) module; and
Either a co-current or counter-current exchange (CCE) module.

The modules may be combined in multiple configurations including:

First Liquid Phase Catalytic Exchange (LPCE) column with electrolyzer;
Second Liquid Phase Catalytic Exchange (LPCE) column with electrolyzer;
Advanced Permeation System (MPS) with electrolyzer;
Dual column LPCE running both forward and reverse catalytic reactions, as described in co-pending Balanced Closed Loop Continuous Extraction Process for Hydrogen Isotopes, Ser. No. 14/294,033 filed Jun. 2, 2014, with a priority date of May 31, 2013, which is herein incorporated by reference in its entirety, that use a second column to replace the electrolyzer;
A dual column system using an APS module for the gaseous diffusion and recovery of hydrogen gases and the second LPCE column for the production of HT; and
A dual column system using an APS module for the gaseous diffusion and recovery of hydrogen gases coupled to either a co-current or counter-current exchange (CCE) process.

In some embodiments these configurations may be combined in series.

In some embodiments, the catalyst includes a Platinum Group Metal, (PGM).

In some embodiments, said catalyst includes PGM coated with a hydrophobic material.

In some embodiments, said catalyst includes PGM coated with a fluoropolymer.

In some embodiments, said catalyst includes PGM coated with a polytetrafluoroethylene.

Some embodiments further include a tritium monitor to monitor the tritium content of the gaseous exhaust within said gaseous exhaust subsystem.

Some embodiments further include a condenser to condense at least some of the gaseous exhaust.

Some embodiments further include a stabilization subsystem for treating said concentrated tritium waste product.

In some embodiments, a method further includes monitoring the tritium content of the effluent with a tritium monitor.

In some embodiments, a method further includes condensing at least some of the effluent.

In some embodiments, a method further includes stabilizing the high activity tritium waste product.

Disclosed herein are systems, methods, and apparatuses for separating tritium from radioactive waste materials and waste water from nuclear reactors. In particular, the present general inventive concept, in some of its several embodiments, includes highly mobile and modular reconfigurable systems and processes for the optimal high throughput and treatment of contaminated water for the concentration, separation, and safe disposition of tritium contaminated waste streams. Herein the term "separation" refers to any of separation, isolation, and/or removal.

FIG. 1 depicts five different tritium separation systems (modules) that are known in the art. The modules may be combined to form relatively balanced closed loops. The modules include:

Electrolyzer 120 that separates tritiated water (HTO) into tritiated hydrogen (HT) and oxygen ($O_2$);

A first Liquid Phase Catalytic Exchange (LPCE) column 600 that separates gaseous tritiated hydrogen (HT) by passing the tritium to the input water ($H_2O$) and forming tritiated water (HTO) and clean hydrogen ($H_2$);

A second Liquid Phase Catalytic Exchange (LPCE) column 700 that separates tritiated water (HTO) and hydrogen ($H_2$) by passing the tritium from the tritiated water (HTO) to clean Hydrogen gas ($H_2$) to produce tritiated hydrogen (HT) and clean water ($H_2O$);

An advanced permeation system (APS) module 201 that separates tritiated gases into clean hydrogen ($H_2$) at a first end and tritium ($T_2$) at a second end; and Either a co-current or counter-current exchange (CCE) module 2000 that transfers tritium ions from tritiated water (HTO) to tritiated hydrogen (HT) and tritium ($T_2$).

Figure 2:
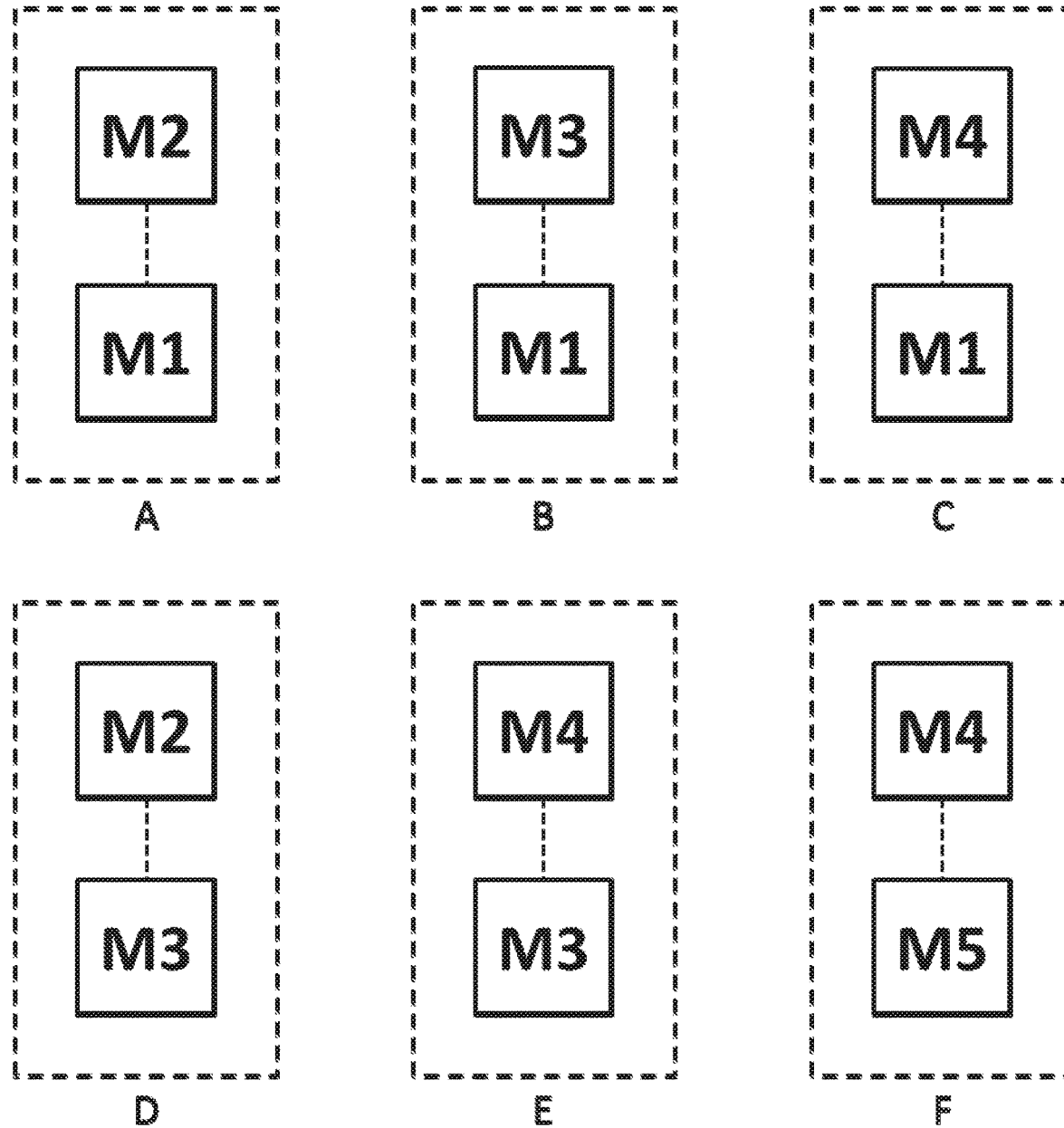
FIG. 2 depicts six potential modular tritium separation systems.

Each of these known tritium separation modules may be used in conjunction with another and/or in series to further increase the concentration of the final tritiated product and the overall efficiency of the system. FIG. 2 depicts six potential systems, each utilizing two different modules from FIG. 1. Each of the six potential systems are shown in more detail in subsequent figures. Other systems are possible, such as cascading a series of two or more of the same or different modules.

First Liquid Phase Catalytic Exchange (LPCE) column with electrolyzer;
Second Liquid Phase Catalytic Exchange (LPCE) column with electrolyzer;
Advanced Permeation System (MPS) with electrolyzer;
Dual column LPCE running both forward and reverse catalytic reactions, as described in co-pending U.S. application Balanced Closed Loop Continuous Extraction Process for Hydrogen Isotopes, Ser. No. 14/294,033 filed Jun. 2, 2014, with a priority date of May 31, 2013, which is herein incorporated by reference in its entirety, that use a second column to replace the electrolyzer;
A dual column system using an APS module for the gaseous diffusion and recovery of hydrogen gases and the second LPCE column for the production of HT; and
A dual column system using an APS module for the gaseous diffusion and recovery of hydrogen gases coupled to either a co-current or counter-current exchange (CCE) process.

Figure 3:
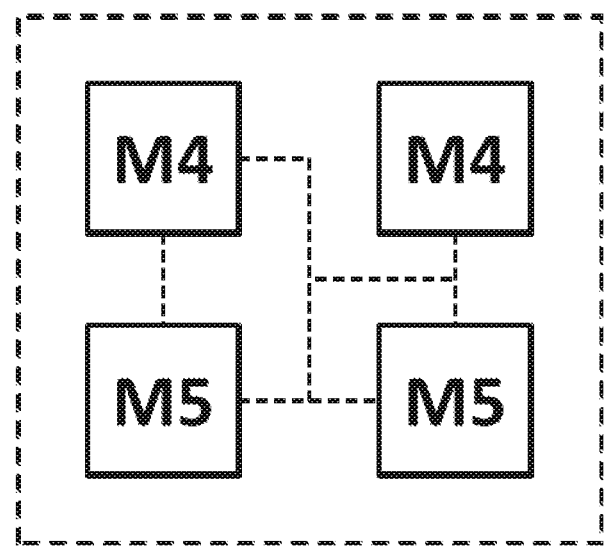
FIG. 3 depicts a modular tritium separation system in series.

FIG. 3 depicts system F of FIG. 2 in series. This configuration is shown and described in further detail in FIG. 25.

Separation

Figure 4:
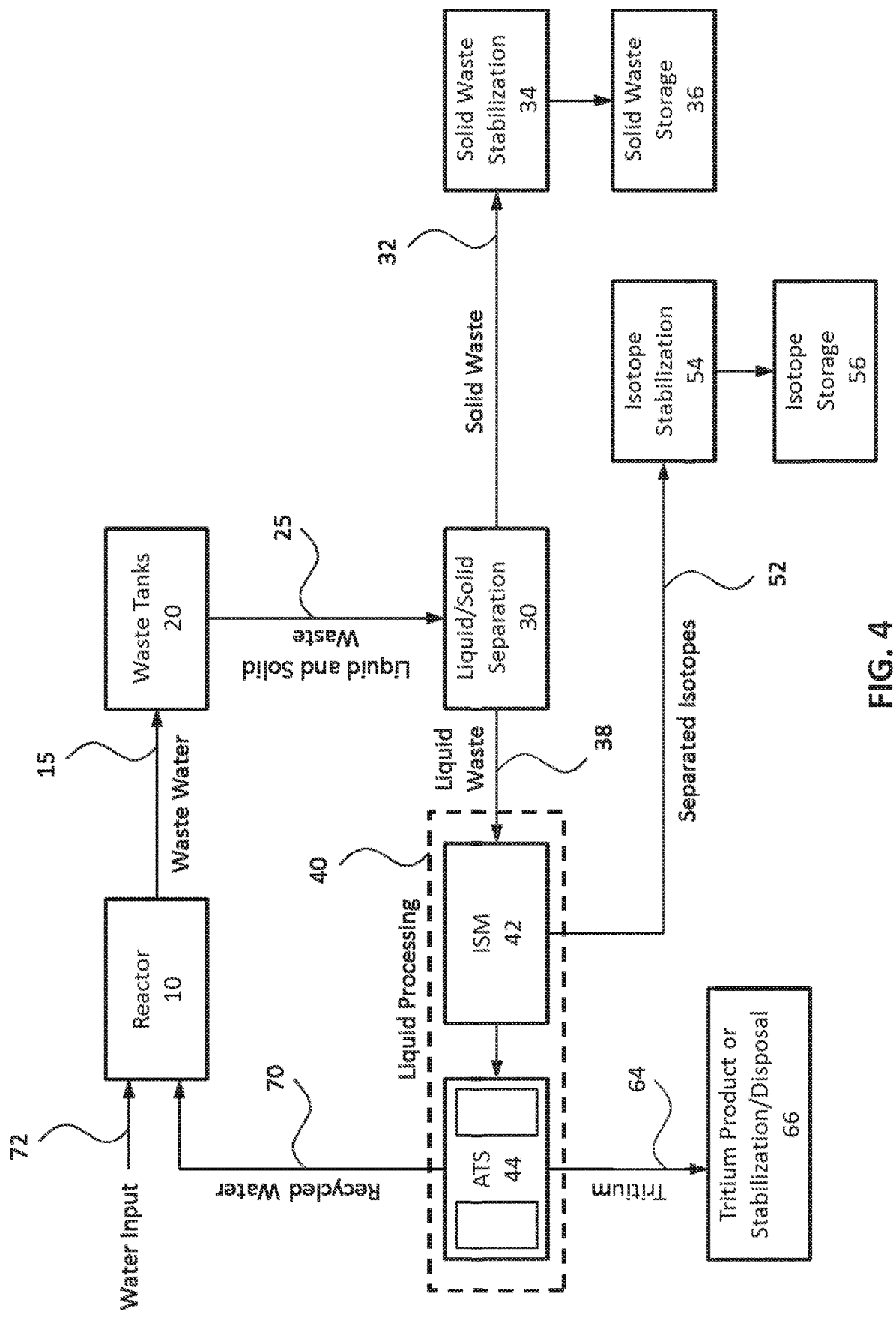
FIG. 4 depicts an example of a system for processing radioactive waste materials that includes an ATS for separating tritium from liquid radioactive waste material.

FIG. 4 illustrates an example embodiment of a larger system within which an advanced tritium system (ATS) 44 for tritium separation is a component. As shown in the illustration, radioactive waste material 15 from a nuclear reactor 10 is conveyed first to waste tanks 20, where the waste material is kept submerged in water; as a result of storing radioactive waste, the water itself comes to contain a concentration of radioactive isotopes. The waste material, which at this stage includes both liquid and solid wastes 25, is conveyed from the waste tanks 20 to a liquid/solid separation system 30 where liquid wastes 38 (including the water from the waste tanks 20) are separated from the solid wastes. From the liquid/solid separation system 30, the solid wastes 32 proceed to stabilization 34 and storage 36. It is possible that, in some instances, not all of the moisture or liquid mixed with the solid wastes 32 will be separated from the solid wastes 32 by the liquid/solid separation system 30, in which case the stabilization and storage of those wastes will proceed differently.

From the liquid/solid separation system 30, liquid wastes 38 that are substantially free of solid waste material proceed to a liquid processing system 40. In some embodiments, such as the one illustrated in FIG. 4, the liquid processing system 40 comprises an ion-specific-media (ISM) based system 42 for the separation of specific ions and an ATS 44 for the separation or removal of tritium from the liquid wastes 38. Separated ions 52 removed by the ISM from the liquid wastes 38 are stabilized 54 and moved to storage 56 or other disposition (with the final disposition or storage conditions often dependent upon the specific ions involved). Tritium 64 removed from the liquid wastes proceeds to its own disposition 66. The liquid 70 (mostly water), now substantially free of specified radioactive isotopes and tritium, usually is recycled into the reactor 10, where it is combined with other water 72 fed into the reactor 10. In some embodiments, liquid emerging from the liquid processing system 40 proceeds, not to the reactor 10 to be recycled, but to storage for low-classification waste.

Figure 5B:
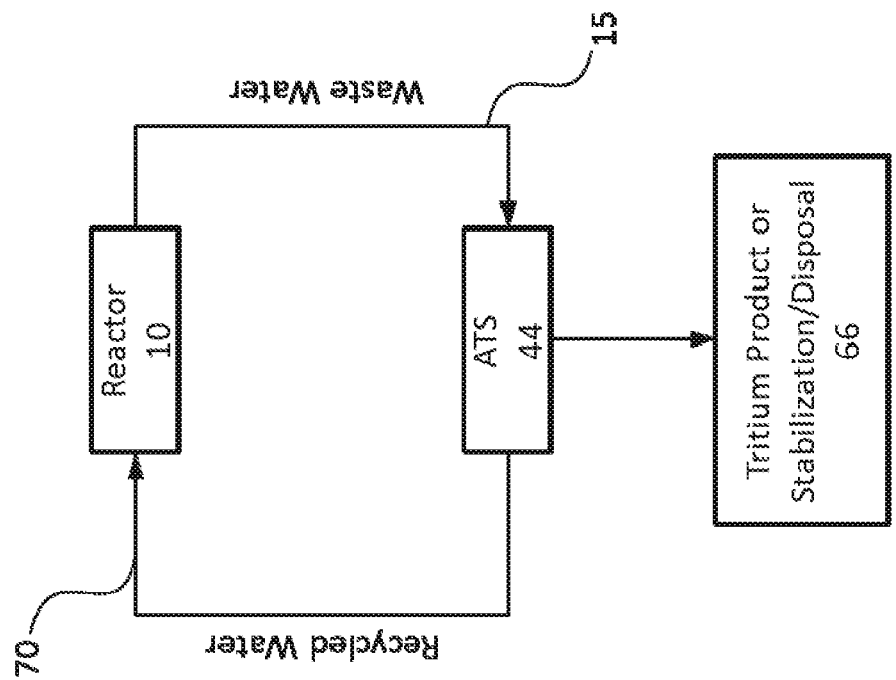
FIG. 5B depicts the embodiment of FIG. 5A with the process water being recycled back to the nuclear reactor.
Figure 5A:
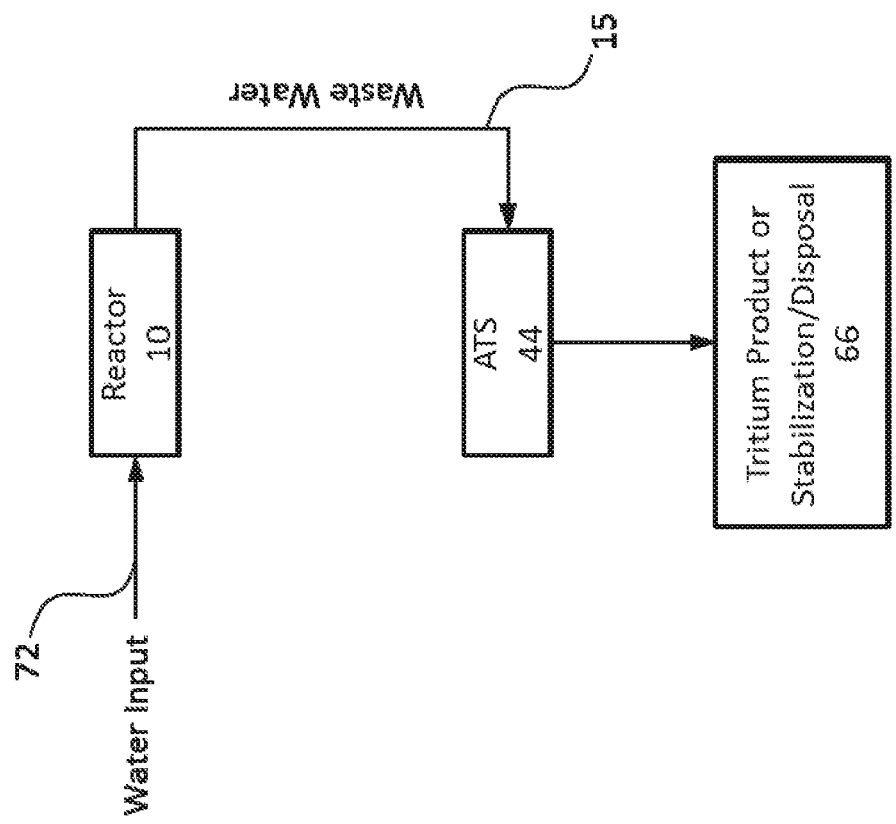
FIG. 5A depicts an example embodiment of the present invention in which an ATS is used for separating tritium from the water used to cool a nuclear reactor.

FIG. 5A illustrates another way in which an ATS 44 according to the present invention is used with a nuclear reactor 10. In the illustrated embodiment, water input 72 is supplied to the reactor 10. Waste water 15 emerges from the reactor 10 and is passed through an ATS 44 in order to remove tritium contaminants from the water. The separated tritium is diverted to disposal 66, either on-site or off-site, or made into a concentrated product. Alternatively, the water 70, substantially freed of tritium contaminants, is recycled back into the reactor 10 as shown in FIG. 5B.

Passing tritiated water from a nuclear reactor 10 (FIGS. 4 and 5), or from radioactive waste, through an ATS 44 results in a product of concentrated tritiated water. The ATS 44 reduces the volume of water that includes tritium.

Figure 6:
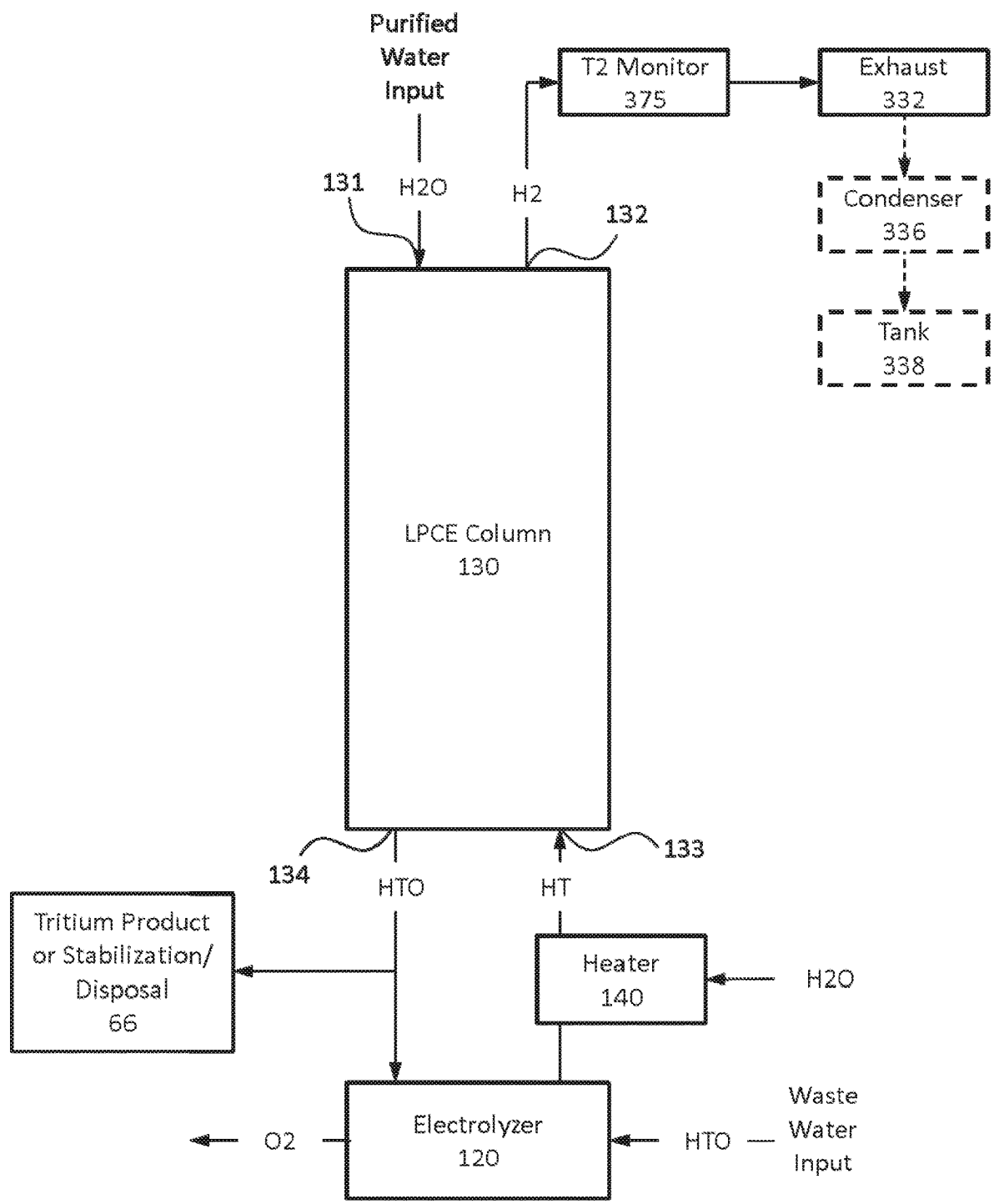
FIG. 6 depicts an example embodiment in which an ATS includes an electrolysis system, a column, and a monitor to monitor the expulsion of detritiated hydrogen.

Some embodiments of the present invention include using an ATS 44 to concentrate tritium in reactor water into a small volume of concentrated tritiated water. FIG. 6 illustrates one example embodiment of the present general inventive concept. In the illustrated example embodiment, low activity waste water containing HTO (and other tritiated water compounds, like $T_2O$) is input into electrolyzer 120 or other separation system—generally an alkaline electrolyzer, although other electrolyzers and separation approaches are contemplated—which separates the tritiated water to produce oxygen gas ($O_2$) and hydrogen gas comprising a number of hydrogen isotopes and isotope combinations (e.g. $H_2$, HT, $T_2$). The oxygen gas is diverted and discharged from the ATS 44, while the hydrogen gas is combined with heated water vapor within a heater 140 (combining the hydrogen gas with heated water vapor increases the throughput of the system); the mixture of hydrogen gas and water vapor is then directed through inlet 133 into the bottom of a LPCE column 130. Purified water (deionized or distilled) enters the top of the LPCE column 130 at inlet 131. Within the LPCE column 130, tritiated gases (HT, $T_2$) from the electrolysis system 120 are retained on the catalyst, while hydrogen gas ($H_2$) passes through the LPCE column 130 to outlet 132 and is expelled as gaseous exhaust 332. As the tritiated gases from the electrolysis system 120 rise through the LPCE column 130 and are retained on the catalyst, the deionized water trickles down the LPCE column 130 and reacts with the retained tritiated gas molecules to form HTO (and, sometimes, $T_2O$). The newly formed tritiated water product exits column 130 at outlet 134 as a concentrated high activity tritium product. In some embodiments, the concentrated high activity tritium product is passed through the electrolyzer 120 and LPCE column 130 multiple times to enhance the concentration of tritium in the concentrated high activity tritium product. In some embodiments, the concentrated high activity tritium product exits the system for storage, stabilization, or disposal 66.

As noted, the hydrogen gas ($H_2$) produced by electrolysis and passed through the LPCE column 130 generally is expelled along with water vapor as gaseous exhaust 332, as shown in FIG. 6. In some embodiments, a tritium monitor 375 measures the tritium content of the exhaust gas as it leaves the LPCE column 130, thus monitoring whether tritium is being released from the ATS 44. A number of options exist for the disposition of the expelled hydrogen gas exhaust 332. In some embodiments, the hydrogen gas and water vapor optionally are passed through a condenser 336 and then into a storage tank 338. In some embodiments, the hydrogen gas is used as fuel. In some embodiments, the hydrogen gas is recombined with oxygen to form water. In some embodiments, the hydrogen gas is burned.

Multiple options exist for the further disposition of the tritium after it is separated and concentrated by the ATS 44. In some embodiments, the concentrated tritiated water is buried or placed into long-term storage in canisters. In some embodiments, tritium gas is recovered from the concentrated tritiated water.

Figure 7:
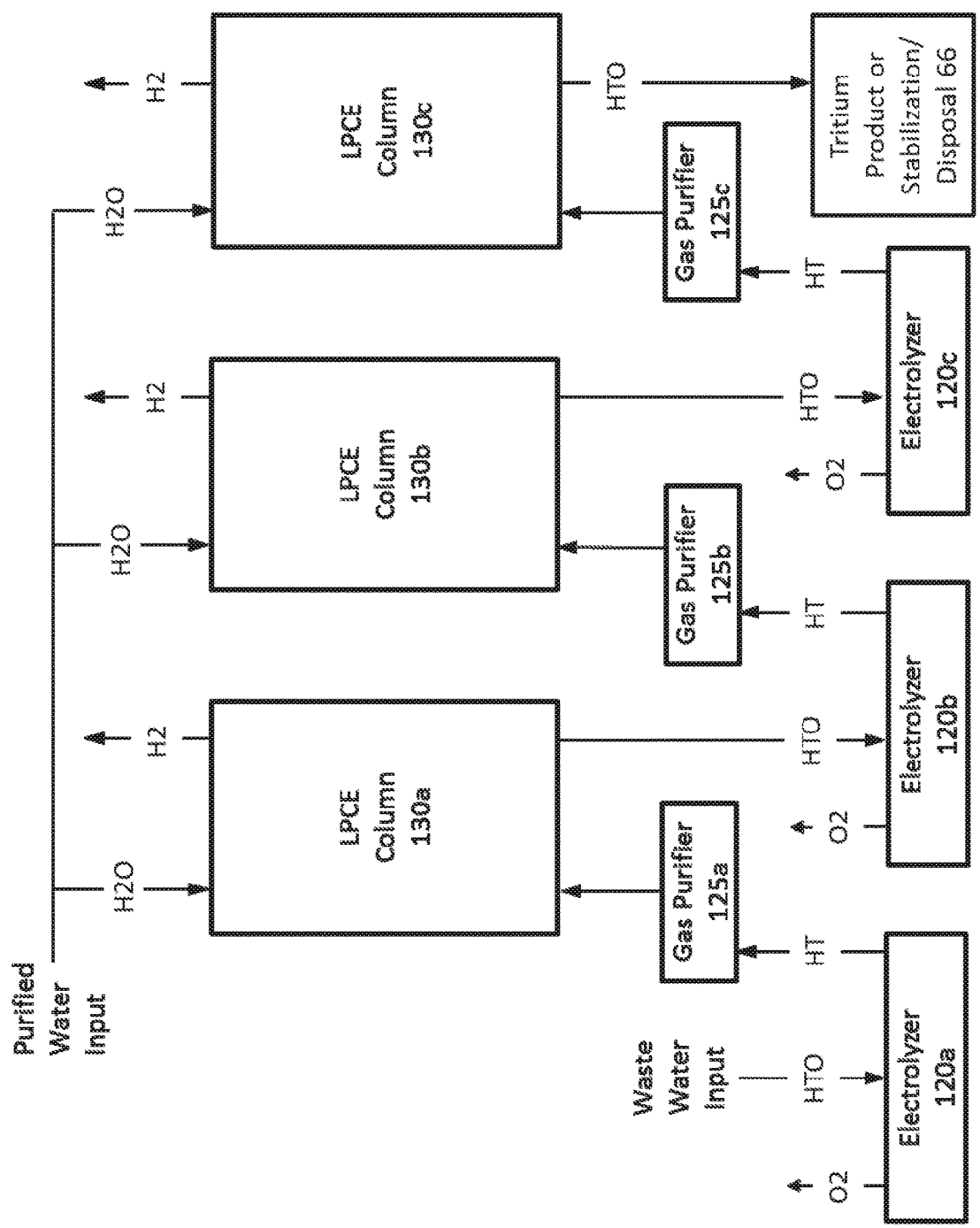
FIG. 7 depicts an example embodiment of the present invention in which an ATS includes multiple catalytic exchange columns in series.

In some embodiments of the present invention, tritiated water is passed through multiple catalytic exchange columns in series. FIG. 7 illustrates one embodiment of the present invention in which tritiated water from a reactor 10 (FIGS. 4 and 5) or a waste source is passed through a first electrolyzer 120a, a first gas purifier 125a, and a first catalytic exchange column 130a; the output tritiated water from the first catalytic exchange column 130a is then passed through a second electrolyzer 120b, a second gas purifier 125b, and a second catalytic exchange column 130b; and the output tritiated water from the second catalytic exchange column 130b is then passed through a third electrolyzer 120c, a third gas purifier 125c, and a third catalytic exchange column 130c before proceeding to disposition 66. Passing the tritiated water through multiple catalytic exchange columns more thoroughly separates protonic hydrogen from tritium and yields a purer, more concentrated final tritium product and/or minimizes the volume of tritium-contaminated waste water as well as minimizing or eliminating the environmental discharge of the contaminated water.

Catalytic Exchange Column Science

It was disclosed in the prior art that different hydrogen isotope concentrations, different temperatures, and different pressures yielded differing and predictable separation factors depending on the physicochemical form of tritium at the start of the chemical exchange reaction, three reactions were possible:

$$HT(g)+H_2O(l) \leftrightarrow H_2(g)+HTO(l) \text{ (forward reaction)} \quad (1)$$

$$HTO(v)+H_2(g) \leftrightarrow H_2O(v)+HT(g) \text{ (reverse reaction)} \quad (2)$$

$$HTO(l)+H_2(g) \leftrightarrow H_2O(l)+HT(g) \quad (3)$$

where (g), (v), and (l) are indicative of phases gas, vapor, and liquid.

Regardless of the exchange reaction identified above (e.g. equation (2) and equation (1)), it was clearly understood and known in the art there were multiple possible outcomes of a catalyzed reaction in the presence of a hydrophobic catalyst when the conditions including temperature, concentrations, flow rates, and pressures are set to optimize one of the desired reactions above (1), (2), or (3) within the LPCE column.

Table 1 shows the equilibrium constant of reaction (1), $$K = \frac{[HTO]}{[HT]},$$

at different temperatures. The fact that K decreases with temperature implies that the reverse reaction (2) is thermodynamically favored at higher temperatures.

TABLE 1

| Equilibrium Constant for Reaction (1) | |
|---|---|
| Temperature (° C.) | Equilibrium Constant |
| 20 | 6.47 |
| 56 | 5.05 |
| 80 | 4.37 |
| 158 | 3.10 |
| 217 | 2.64 |
| 303 | 2.17 |

In an embodiment, and with the above in mind, it is possible to replace the electrolyzer of the previous embodiments with a second LPCE column catalyzing the reverse reaction (2) as illustrated by FIGS. 10 and 11. The dual-column system then works as follows. In the first-column, also called "forward column", tritium is transferred from hydrogen gas to water following the forward reaction (1) at a given temperature $T_f$. In the second column, also called "reverse column", tritium is transferred from water to hydrogen gas following the reverse reaction (2) at a temperature $T_r > T_f$. Thus, a concentration profile is established at equilibrium such that the highest tritium concentrations are found at the bottom 603, 604 (top 701, 702) of the forward (reverse) column. Conversely the hydrogen (water) flow 602 (704) at the outlet of the forward (reverse) column is essentially free of tritium and can be recirculated into the inlet 703 (601) of the reverse (forward) column, as illustrated by FIG. 11C.

For optimal efficiency and molar throughputs of the system, it is expected that the temperature of the forward column should be in the range of $T_f = 20\text{-}60°$ C., the temperature of the reverse column in the range of $T_r = 80\text{-}140°$ C., and the gas pressure in either column in the range of 5-20 atm.

Electrolyzer LPCE Modular Systems A, B, and C
Modules 1-3, Systems A-C

Thus, in some of the several example embodiments of the present invention depicted in FIGS. 1-3, systems, methods, and processes are disclosed for a modular TRS for high throughput, low concentration processing of low activity tritiated light water including the separation of at least some of the tritiated water to produce hydrogen and tritium gas.

Embodying these concepts, and referring now to FIG. 8 the first LPCE column 600 (hereinafter referred to as the first column), comprises an inlet 601 at the top wherein clean water ($H_2O$) is introduced; an outlet 602 at the top where clean hydrogen gas ($H_2$) is exhausted; an inlet 603 at the bottom where tritiated hydrogen gas (HT) is introduced; and an outlet 604 at the bottom where tritiated water (HTO) exits the first column 600. This operation is defined by equation (1). The electrolyzer 120 vents oxygen gas ($O_2$) at 122 to the atmosphere.

Figure 9:
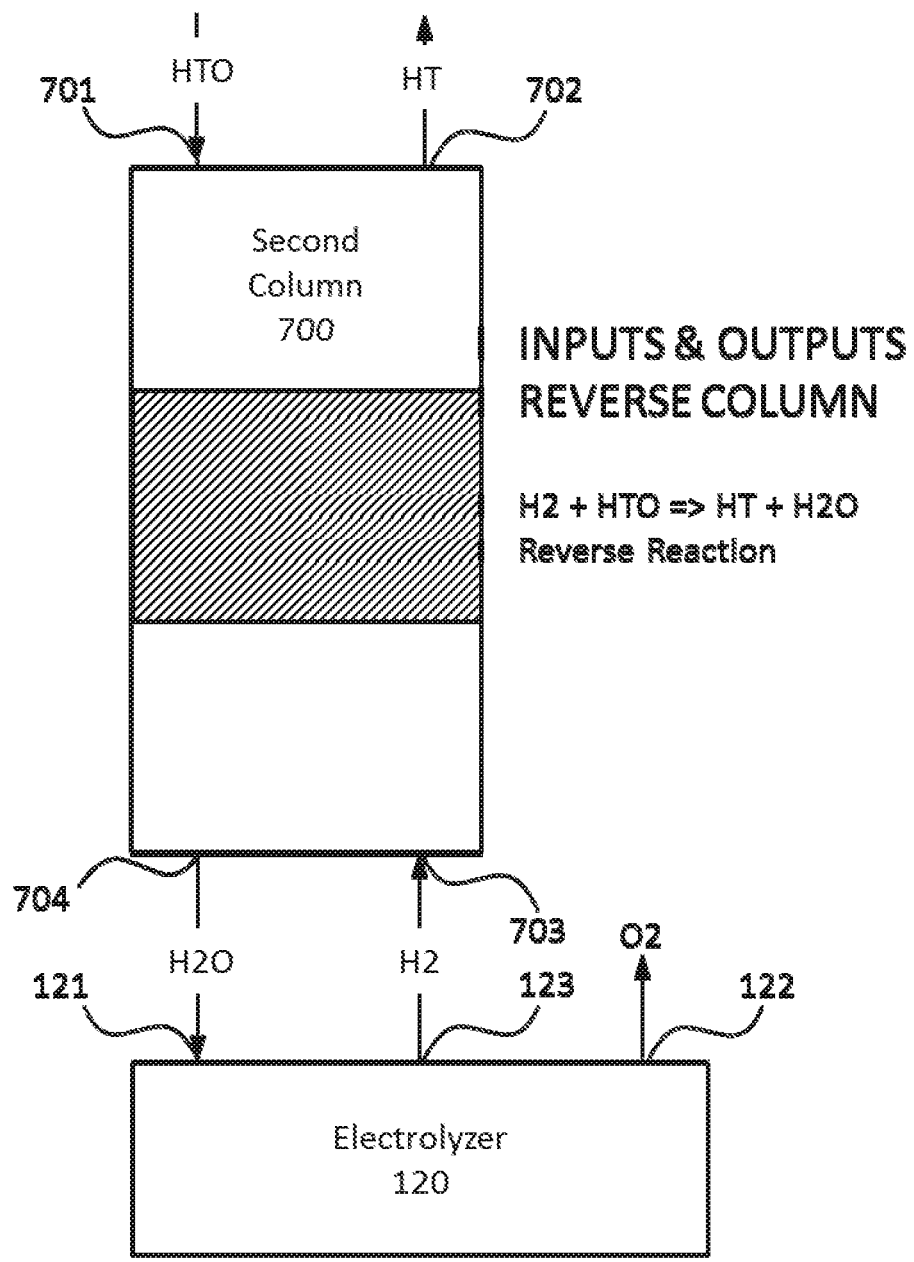
FIG. 9 depicts a reverse catalytic exchange column according to equation (3) below in the discussion of an alternate embodiment.

Referring now to FIG. 9 which depicts a second LPCE column 700 (hereinafter the second column) comprising a same catalyst in some embodiments as the first column 600, an inlet 701 at the top wherein tritiated water (HTO) is introduced; an outlet 702 at the top where tritiated hydrogen gas (HT) is exhausted; an inlet 703 at the bottom where clean hydrogen gas ($H_2$) is introduced; and an outlet 704 at the bottom where clean water ($H_2O$) exits the second column 700. This operation is defined by equation (2). The electrolyzer 120 vents oxygen gas ($O_2$) at 122 to the atmosphere.

Figure 8:
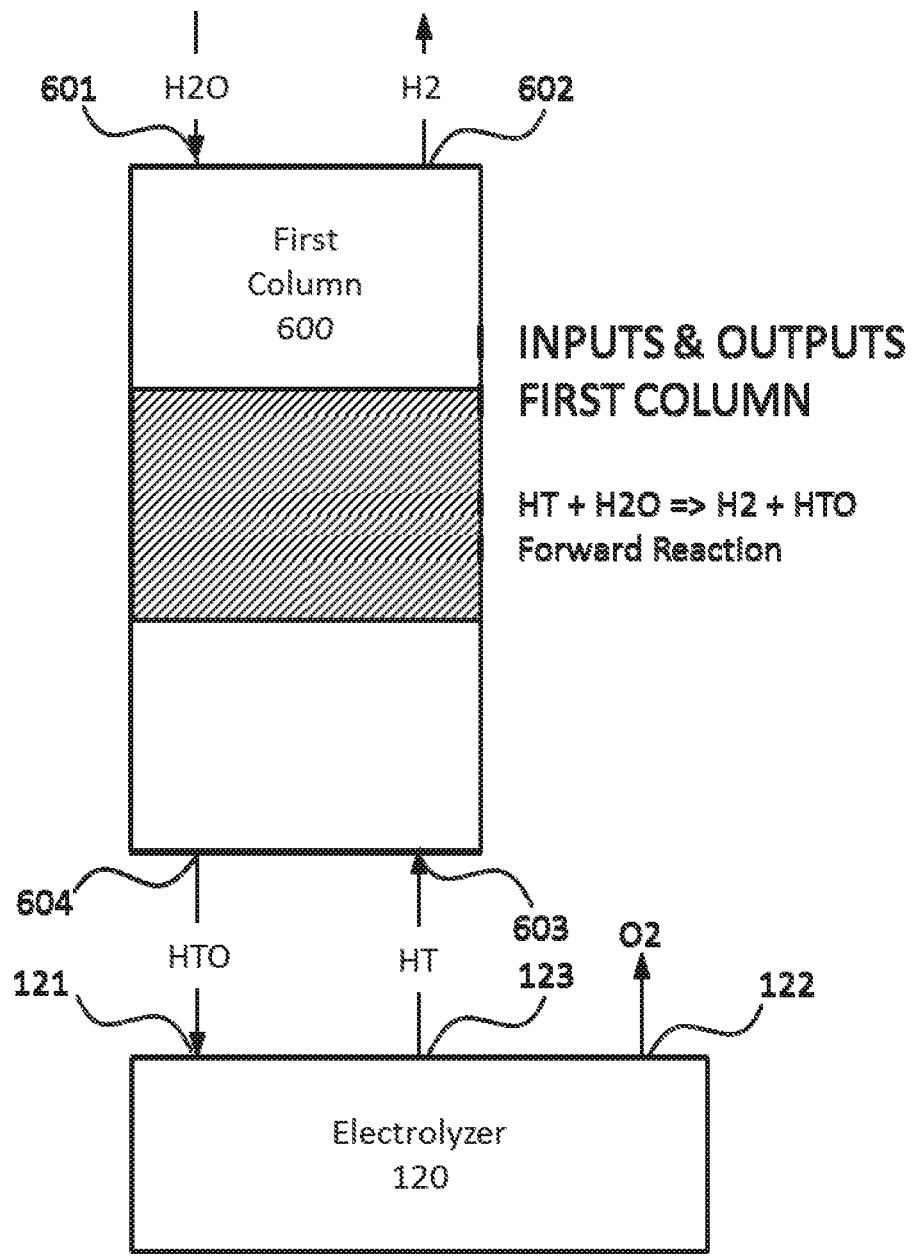
FIG. 8 depicts a reverse catalytic exchange column according to equation (2) below in the discussion of an alternate embodiment.

In a discussion of the role of the electrolyzers 120 in FIGS. 6, 8, and 9 and their respective inputs and outputs: in FIG. 6, the electrolyzer 120 receives HTO(l) from at least one of the LPCE column 130 at outlet 134 and/or from waste water input, and HT(g) exits the electrolyzer and enters the LPCE column 130 at inlet 133; thus, in an alternate embodiment as depicted in FIGS. 10A and 10B, the electrolyzer 120 may be replaced by a second column 700 configured to accept $H_2$ (hereinafter "clean hydrogen gas") and feed water containing HTO and produce hydrogen gas comprising a number of hydrogen isotopes and isotope combinations (e.g. $H_2$, HT, $T_2$).

The electrolyzer 120 of FIG. 8 takes in tritiated water in liquid phase (HTO) from first column outlet 604 and outputs HT gas back into the first column 600 at inlet 603. FIG. 9 depicts a second column 700 that has the same inputs and outputs of the electrolyzer 120 of FIG. 8. FIG. 10A illustrates an embodiment of the electrolyzer 120 of FIG. 8 with the addition of an outlet between the first column 600 and the electrolyzer 120 wherein high activity tritium product can be removed for storage, stabilization, or disposal 66. FIG. 10B illustrates that according to the embodiments of FIGS. 8 and 9, a simple substitution can be made to replace the electrolyzer 120 of FIG. 8 with the second column 700 of FIG. 9 as both have the same inputs and outputs.

Replacing the Electrolyzer with a Second Column (Module 3)

Module 2 and System D

FIG. 11 further illustrates the natural evolution of the system following the substitution depicted in FIGS. 10A and 10B. FIG. 11A depicts the embodiment of FIG. 8 with the first column 600 in a system with an electrolyzer 120. FIG. 11B depicts the substitution of the electrolyzer 120 with the second column 700. Since the first column 600 output from outlet 604 is the same as the second column 700 input at inlet 701 and the first column 600 input at inlet 603 is the same as the second column 700 output at outlet 702, the system can become closed loop as depicted in FIG. 11C.

In an embodiment, the first column 600 comprises an elongated cylindrical column having a first end, a second end, stainless steel tubing wrapped with a heating mantle, an over coat with insulation. The first column 600 may contain liquid and/or gas flow distributors or diffusers to enhance the distributions and mixing in the first column 600. In some embodiments, feed water is introduced at or above the mid-point of the first column 600.

Figure 12:
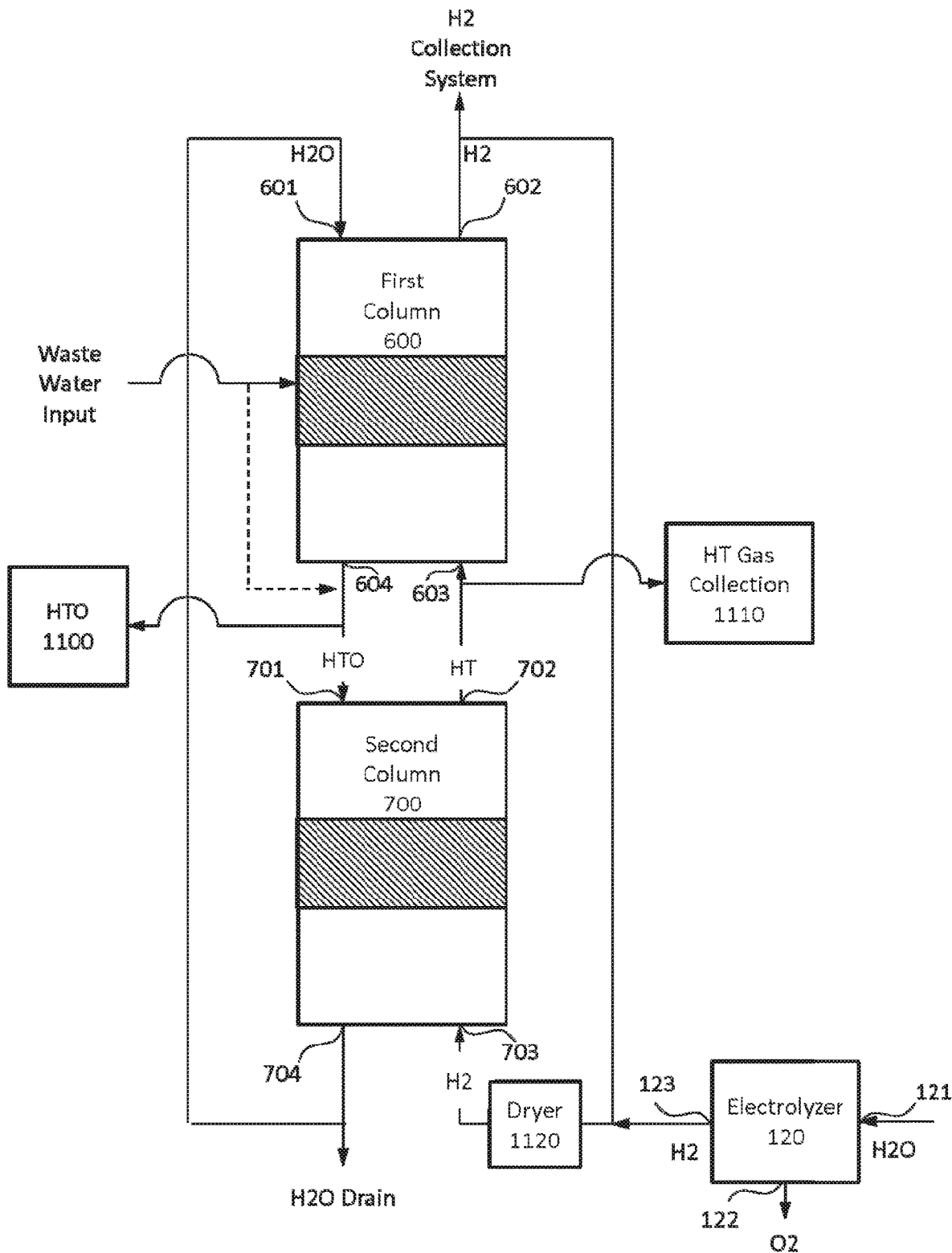
FIG. 12 depicts the system of FIG. 11C in more detail.

FIG. 12 depicts an embodiment of the system of FIG. 11C. The embodiment of FIG. 12 includes additional inputs and outputs to the system. Tritiated water may be collected 1100 from between first column outlet 604 and second column inlet 701. HT gas may be collected 1110 from between second column outlet 702 and first column inlet 603. Liquid water may be drawn from the bottom of the second column 700 between second column outlet 704 and first column inlet 601.

In an embodiment of FIG. 12, $H_2$ feed gas is preheated (by a heating means such as a heater or dryer 1120) and introduced into the bottom of the second column 700 at inlet 703 creating a counter flow (i.e., will flow in the opposite direction) to the tritiated water (HTO) in the second column 700. The second column 700 may include a catalyst for catalyzing the reaction of tritiated light water (HTO) with $H_2$ gas forming an HT gas and clean water according to equation (2).

The $H_2$ gas is supplied to the second column 700 from an electrolyzer 120 adapted to produce the $H_2$ gas. Alternately the $H_2$ gas may be supplied from a remote location such as a storage tank. The $H_2$ feed gas is introduced into the second column 700 at inlet 703. To aide in initiating and maintaining the catalytic reaction, temperature ranges of 35-250 degrees centigrade are used at pressures of 500-1100 mbar; in alternate embodiments, pressures and temperatures may be multiples or fractions of the preferred embodiment.

These reactions create tritium concentration gradients of highest concentration at the top of the second column 700 and the bottom of the first column 600, and lowest concentration at the outer ends of each column. HT gas emerges from the top of the second column 700 at outlet 702 and enters the bottom of the first column 600 at inlet 603. Water ($H_2O$) emerges from the bottom of the second column 700 at outlet 704 and enters the top of the first column 600 at inlet 601. A portion of the water ($H_2O$) may be transferred out of the system via a drain at the bottom of the second column 700. The drained water ($H_2O$) may be stored or reused. For example, the drained water ($H_2O$) may be stored in a container, reservoir, or holding tank for later transport or use.

The water ($H_2O$) is transferred into the top of the first column 600 at inlet 601. The first column 600 is filled with a catalyst. The HT gas is transferred into the bottom of the first column 600 at inlet 603. The second and first columns, 700 and 600 respectively, in the preferred embodiment are constructed such that the first column 600 is capable of catalyzing the reaction of water ($H_2O$) and HT gas into tritiated water (HTO) and $H_2$ gas; this reaction is represented by equation (1).

An embodiment of FIG. 12 is implemented such that the water ($H_2O$) being introduced into the top of the first column 600 at inlet 601 will act as a counter flow to the rising HT gas introduced in the bottom of the first column 600 at inlet 603. The sinking water ($H_2O$) exchanges ions with the introduced HT gas as it traverses the forward catalyst and is mixed with the clean water ($H_2O$) resulting in a catalyzed reaction according to equation (2). Tritiated water (HTO) emerges at the bottom of the first column 600 at outlet 604.

In an embodiment of FIG. 12 the clean $H_2$ gas is introduced into the bottom of the second column 700 at inlet 703 and the $H_2$ gas may come from the first column 600. The tritiated water (HTO) emerging from the first column 600 at outlet 604 is introduced into the top of the second column 700 at inlet 701.

In a closed loop system, where there is no consistent introduction of feed water and no clean water ($H_2O$) is removed from the system via a drain, there is no generation of product and the molar ratio of hydrogen gas to feed water is operatively efficient at 1. In alternate embodiments, molar ratios ranging from 0.5 to 4 may be desired, while still retaining a closed loop. Once the tritium concentration gradients are established in the columns, a tritiated water (HTO) feed 1100 can be introduced between the columns and detritiated water ($H_2O$) 500 can be drawn off at the drain for storage, transport, or other disposition.

In an embodiment of FIG. 12, the tritiated feed water (HTO) 1100 is introduced at any point between the midpoint of the first column 600 and top of the second column 700. The tritium in this feed will concentrate into the top of the second column 700 and bottom of the first column 600 and the excess liquid from the feed can be drawn from the bottom of the second column 700 as clean water ($H_2O$) via a drain. This process will allow a feed of tritiated water (HTO) and a product of detritiated water ($H_2O$) without any need for electrolysis or recombination, therefore greatly reducing the complexity and the energy needs of the whole process. Furthermore, the system may be sized to keep the fraction of tritium released through the drained water below any preset limit, in some embodiments typically in the range of 0.1% to 10% of the total tritium inventory. Continuous operations for a System D operation are discussed in co-pending application Advanced Tritium System and Advanced Permeation System for Separation of Tritium from Radioactive Wastes and Reactor Water in Light Water Systems, Ser. No. 62/239,660 filed Oct. 9, 2015, which is herein incorporated by reference in its entirety.

In an embodiment of FIG. 12, some of the hydrogen gas supplied to the second column 703 is supplemented by an electrolyzer of varying size, which may be used to decrease the cross section of the forward and reverse columns at a fixed waste water feed. This embodiment then offers an additional opportunity for optimization by allowing the designer to find a trade-off between the total volume of the column in the system and the energy consumption of the electrolyzer. In some other embodiments, the electrolyzer is fed with a fraction of the tritiated water at the bottom 604 of the first column, and used to feed tritiated hydrogen to the bottom 603 of the same column.

Figure 13:
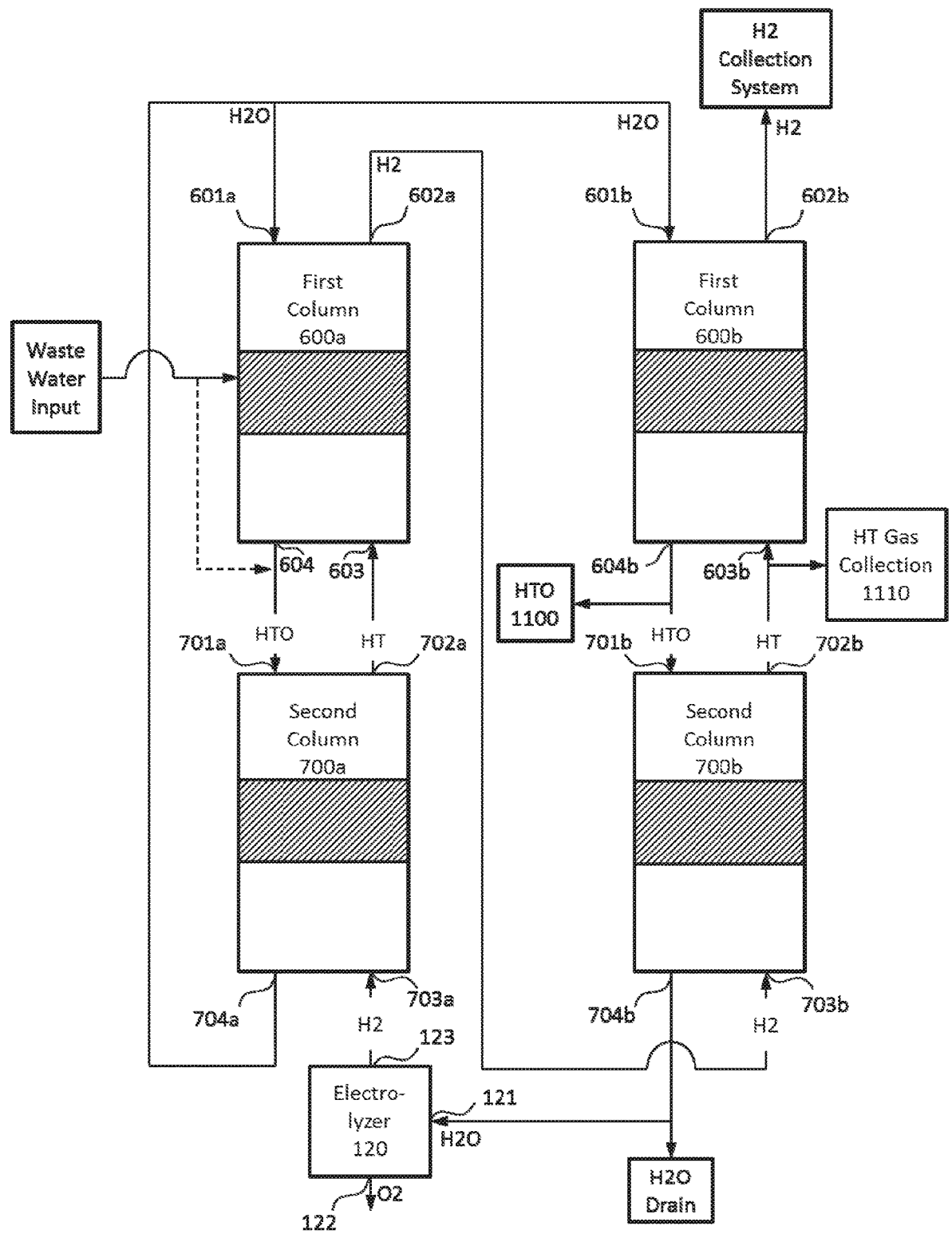
FIG. 13 depicts the system of FIG. 12 in series.

FIG. 13 depicts the system of FIG. 12 in series. As in FIG. 12, waste water is input in the first column 600*a* or, alternatively, in between the first column 600*a* and second column 700*a*. In this configuration, the $H_2O$ product from second column 700*a* outlet 704*a* is routed back through both first columns 600*a,b* at inlets 601*a,b*. The $H_2O$ output from second column 700*b* at outlet 704*b* is at least one of drained and fed through and electrolyzer 120 at inlet 121 and the resulting $H_2$ from outlet 123 is passed into second column 700*a* at inlet 703*a*. The $H_2$ output from first column 600*a* at outlet 602*a* is fed into the second column 700*b* at inlet 703*b* instead of the first second column 700*a* inlet 703*a*. As in FIG. 12, HTO and HT gas can be collected from between first column 600*b* and second column 700*b* at 1100 and 1110, respectively. The $H_2$ output from first column 600*b* at outlet 602*b* is collected at the $H_2$ collection system.

Module 4—Permeation

Figure 14:
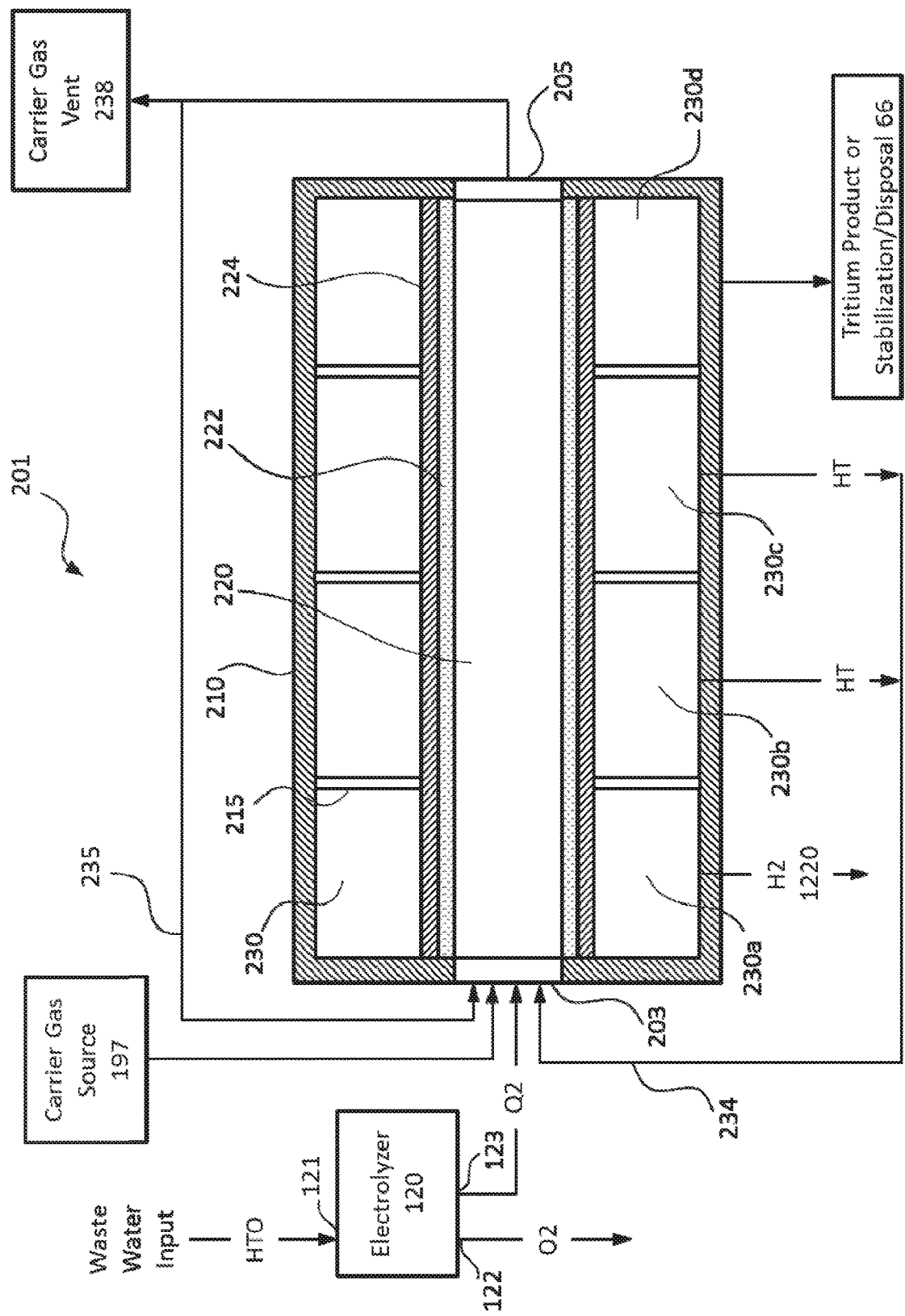
FIG. 14 depicts an APS module used for separating tritium from the hydrogen gas.

In some embodiments of the present invention, tritium is separated from protonic hydrogen through a combination of gas chromatography or gaseous diffusion and hydrogen permeation through metal—a combination referred to collectively as the advanced permeation system (APS) 201. In one embodiment of the APS 201, illustrated in FIG. 14, tritiated waste water (HTO) enters an electrolyzer 120 and is broken up by electrolysis into a combination of oxygen gas ($O_2$) and tritiated hydrogen gas comprising a number of hydrogen isotopes and isotope combinations (e.g. $H_2$, HT, $T_2$). The tritiated hydrogen gas then enters the APS module 201, which in FIG. 14 is illustrated by a sectional view of a chromatography column or cylinder with an outer wall 210 fabricated from copper, stainless steel, or a similar material. A carrier gas, such as helium or argon, from a carrier gas source 197 is also inserted into the APS module 201 along with the tritiated hydrogen gases. In many embodiments, the gases are pressurized as they enter the APS module 201. In some embodiments, the gases are heated as they enter the APS module 201.

In the illustrated example embodiment, the gases under pressure and slightly elevated temperature enter a first end 203 of the cylindrical APS module 201 and travel along the length of the APS module 201. Within the APS module 201, the tritiated hydrogen gas and the carrier gas 197 initially travel within the interior volume 220 of at least one inner cylinder. The inner cylinder is fabricated from a material that is at least semi-permeable to hydrogen. In the illustrated embodiment of FIG. 14, the inner cylinder comprises two layers: a first layer 222 of stainless steel frit, in direct contact with the interior volume 220 of the inner cylinder; and a second layer 224 of PGM or PGM alloy, such as a PGM/Silver alloy. In some embodiments, the stainless steel frit layer is omitted, and the PGM layer is in direct contact with the interior volume 220 of the inner cylinder. Surrounding the first layer 222 and second layer 224 of the inner cylinder and enclosed by the outer wall 210 of the APS module 201 is a separation volume 230.

As the pressurized mixture of tritiated hydrogen gas and carrier gas enters the first end 203 of the APS module 201 and passes through the internal volume 220 of the inner cylinder, pressure drives hydrogen molecules to permeate the stainless steel frit 222 and the PGM layer 224, so that hydrogen gases collect in the separation volume 230 between the PGM layer 224 and the outer wall 210. The carrier gas, not permeating the stainless steel frit 222 and the PGM layer 224, exits the internal volume 220 of the inner cylinder at the second end 205 of the APS module 201 and is vented at vent 238 or recirculated. Consistent with gas chromatography, lighter hydrogen molecules ($H_2$) permeate the stainless steel flit 222 and the PGM layer 224 closer to the first end 203 of the cylindrical APS module 201; heavier hydrogen molecules (e.g., HT, $T_2$) permeate the stainless steel frit 222 and the PGM layer 224 closer to the second end 205 of the cylindrical APS module 201. In some embodiments, the APS module 201 includes partitions 215 that divide the separation volume 230 into distinct compartments 230*a-d*; the compartments closer to the first end 203 of the APS module 201 for receiving lighter hydrogen molecules, and the compartments closer to the second end 205 of the APS module 201 for receiving the heavier hydrogen molecules, including molecules with tritium atoms. Lighter hydrogen gas ($H_2$) within compartment 230*a* is released from the APS module 201. The heavier tritiated hydrogen gas, collected in the compartment 230*d* at the second end 205 of the APS module 201, passes from the APS module 201 to final disposition or further separation treatment 66. Gas collected in the intermediate one or more chambers 230*b,c* is a mixture of hydrogen ($H_2$) and tritiated hydrogen (HT, $T_2$) and is recycled 234 through the APS module 201 in order to further separate hydrogen from the tritiated gas mixture. In some embodiments the carrier gas is also recycled 235 through the APS module 201 in order to contain and reprocess any tritiated gas remaining in the gas stream at the second end 205 of the APS module 201, to minimize carrier gas usage, and to recover heat.

Figure 15:
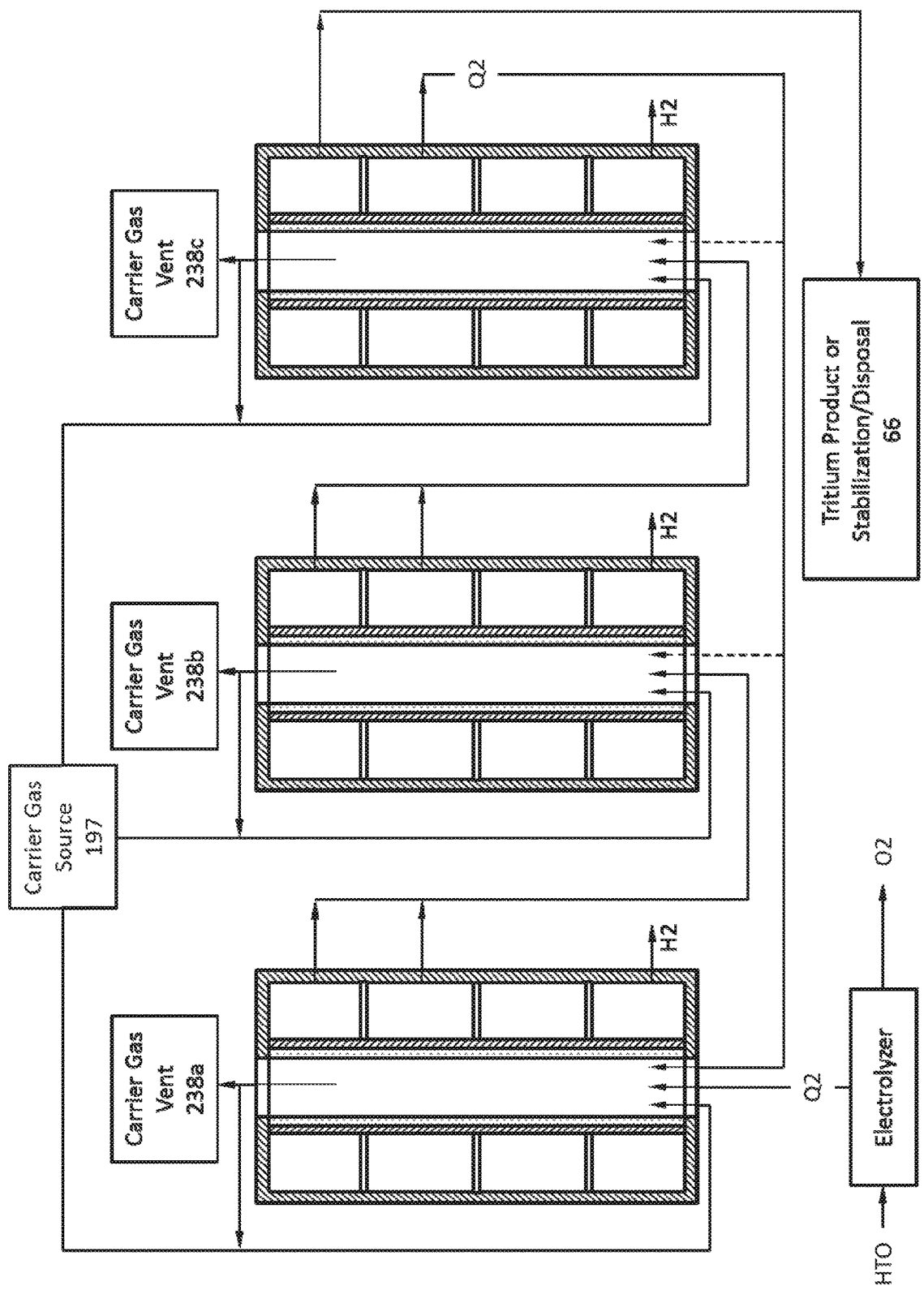
FIG. 15 depicts multiple APS modules in series.

In some embodiments of the present invention, the hydrogen gas with a mixture of hydrogen ($H_2$) and heavier hydrogen isotopes (e.g. HT, $T_2$) is passed through several APS modules in series in order to enhance the separation of lighter hydrogen from heavier hydrogen isotopes, including tritium. FIG. 15 illustrates such a system with three APS modules 201a-c in series. Tritiated waste water is fed to an electrolyzer 120 to produce oxygen, which is vented to atmosphere, and tritiated hydrogen gas. The tritiated hydrogen gas is mixed with a carrier gas from carrier gas source 197 such as helium or argon, is pressurized and heated and passed through a first APS module 201a; within the APS module 201a, gases permeate the stainless steel frit and the PGM layer at different rates, the lighter hydrogen permeating more quickly than the heavier tritiated hydrogen (e.g., HT, $T_2$). Thus the hydrogen gas fraction may be drawn off 238a the first region of the APS module 201a, as previously described, and either vented or captured for other uses. The carrier gas exiting the module 201a may be vented to atmosphere or preferably recirculated through module 201a. Venting or recirculating the carrier gas also applies to modules 201b and 201c. The gas containing heavier hydrogen molecules is then directed 235a through a second APS module 201b, where further separation takes place. Again the lighter hydrogen fraction may be drawn off 238b and vented or captured for other uses. The gas containing heavier hydrogen molecules is directed 235b through a third APS module 201c. Again the lighter hydrogen fraction may be drawn off 238c and vented or captured for other uses. Gas captured in the central region of the third and final APS module 201c is recirculated through module 201a, 201b or 201c. Gas captured in the last region of the APS module 201c is passed to final disposition 66. Passing the gas through each APS module 201 further separates lighter hydrogen molecules from heavier hydrogen molecules and results in a purer, more concentrated final tritium product.

Module 4 and System E

FIG. 16 illustrates the natural evolution of the system following the substitution of the electrolyzer 120 of FIG. 14 with a second column 700. FIG. 16A depicts the embodiment of FIG. 14 with the APS column 201 in a system with an electrolyzer 120. FIG. 16B depicts the substitution of the electrolyzer 120 with the second column 700. Since the APS column 201 input is the same as the second column 700 output the system can become a nearly closed loop as depicted in FIG. 16C.

Figure 17A:
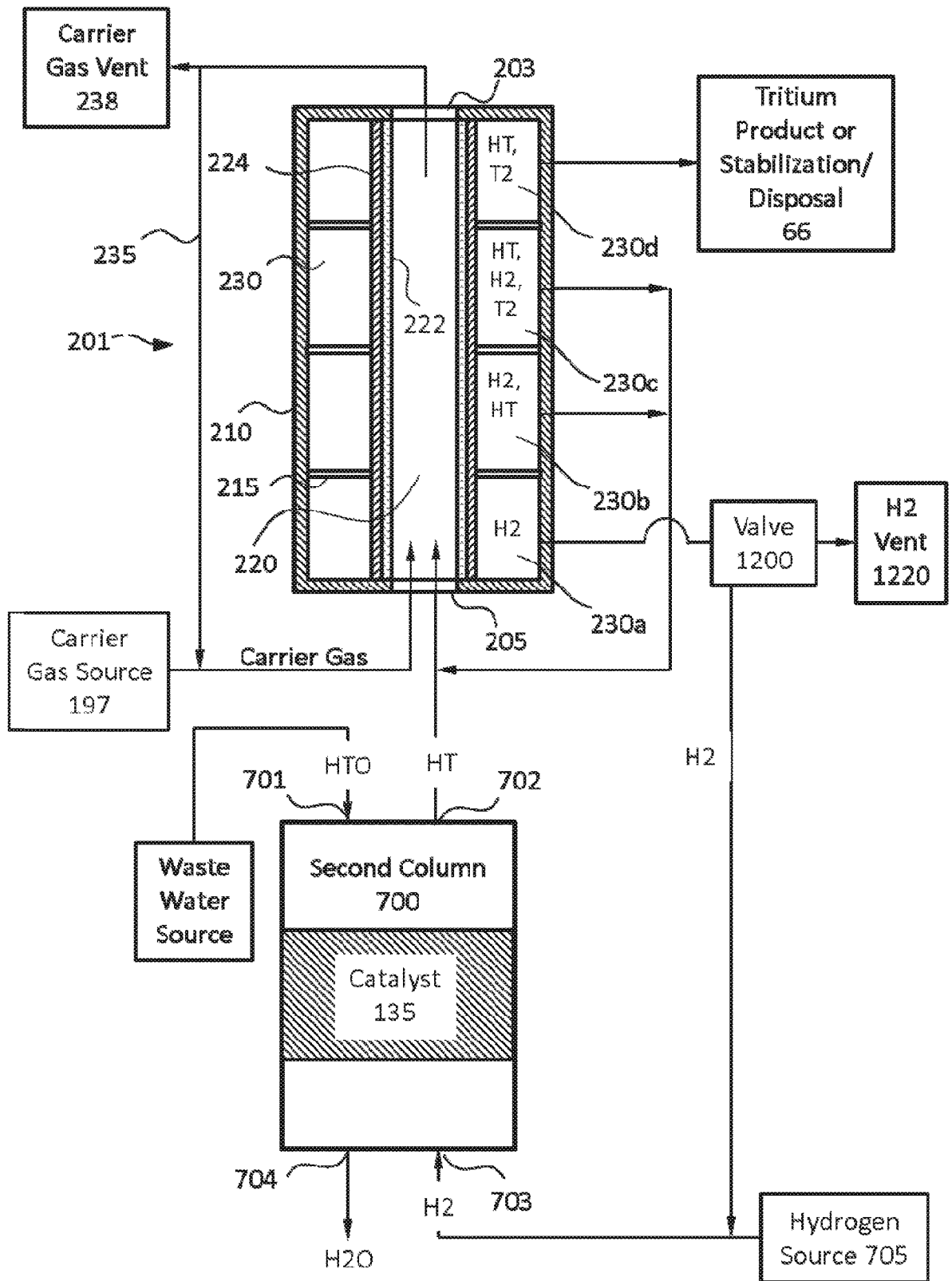
FIG. 17A depicts the system of FIG. 16C in more detail.
Figure 17B:
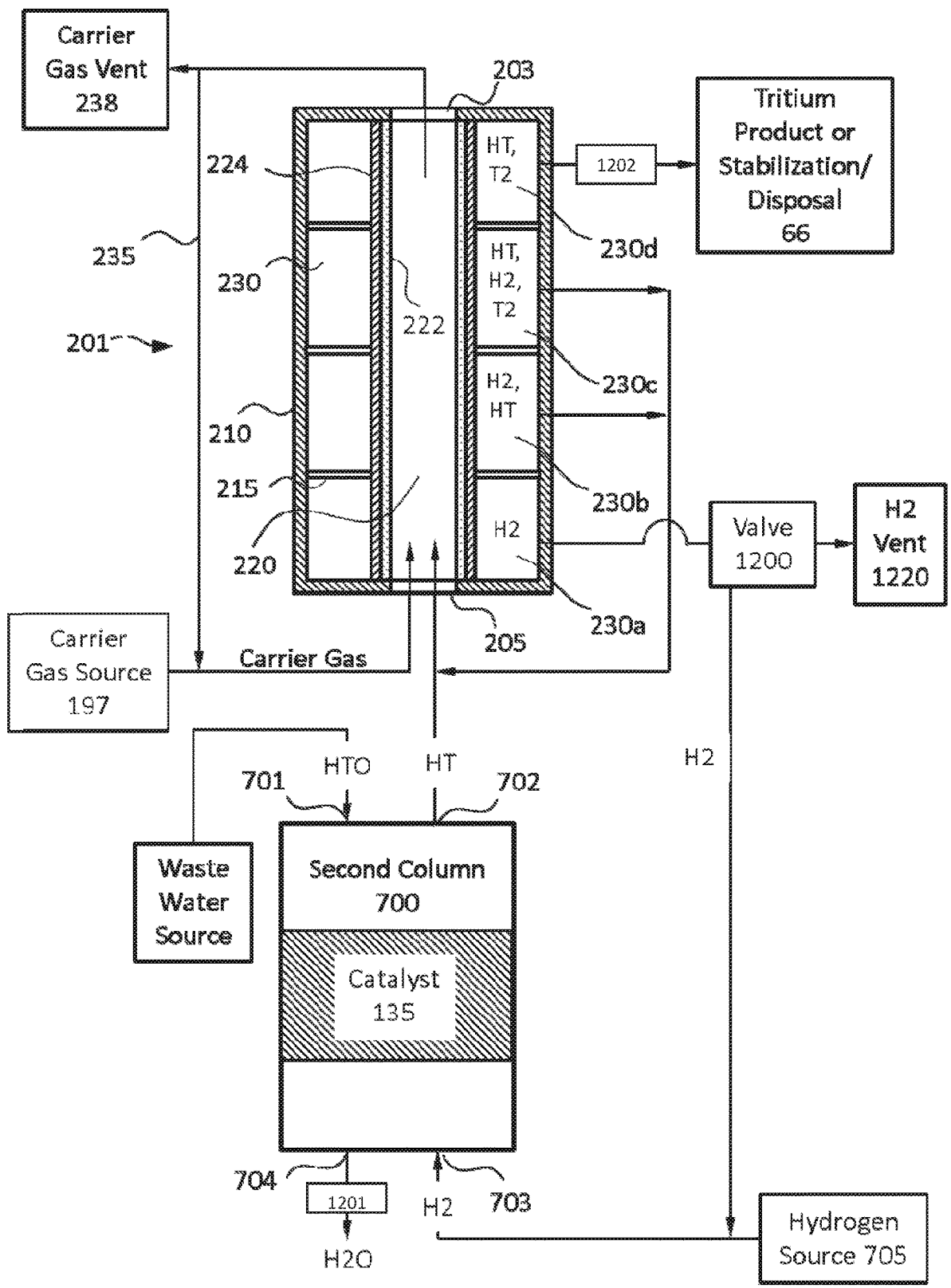
FIG. 17B is an alternate embodiment of FIG. 17A.

FIG. 17A depicts an embodiment of FIG. 16C which combines an APS module with an LPCE column. The result is a permeation based tritium separation system which can achieve a greater concentration and purity of final tritium product than achieved through either approach individually. FIG. 17B depicts an embodiment of FIG. 17A with the addition of valves at the outlets.

Contaminated (i.e. tritiated) waste water is introduced to the system at inlet 701 at the top of the second column 700. The liquid trickles down the column through the previously described catalyst 135 and is stripped of its tritium, exiting the column 700 at outlet 704 (and through valve 1201 in FIG. 17B) as clean water for disposition or re-use. Simultaneously hydrogen, initially from source 705 and later supplemented by gas from chamber 230a, (i.e. a combination thereof) is introduced to the second column 700 at inlet 703. The rising hydrogen gas strips the tritium from the catalyst 135 and exits the second column 700 at outlet 702 as a complex hydrogen gas, comprising a number of hydrogen isotopes and isotope combinations (e.g. $H_2$, HT, $T_2$).

The gas at outlet 702 may be mixed with a carrier gas, such as helium or argon, initially from a carrier gas source 197, and later from APS module 201 outlet 203, and enters the APS module 201 at inlet 205 (i.e. the carrier gas is recycled). In many embodiments, the gases are pressurized as they enter the APS module 201. In some embodiments, the gases are heated as they enter the APS module 201. In the illustrated example embodiment, the gases, under pressure and slightly elevated temperature, enter at inlet 205 of the cylindrical APS module 201 and travel along the length of the APS module 201. Within the APS module 201, the hydrogen gas and the carrier gas initially travel within the interior volume 220 of the module. The gas mixture from the intermediate compartments 230b and 230c is reintroduced to the APS module 201 at inlet 205 for further processing. The heavier tritiated hydrogen gas, collected in the compartment 230d close to the outlet 203 at the top of the APS module 201, passes from the APS module 201 to final disposition or further separation treatment 66. In some embodiments, such as in FIG. 17B, the tritiated hydrogen gas is released through a valve 1202. In some embodiments the tritium content of the tritiated hydrogen gas is monitored and is only released through valve 1202 when the tritium content meets a predetermined level. The lighter hydrogen gas (which is mostly $H_2$) accumulated in compartment 230a is passed through a valve 1200 where the gas is passed through at least one of a vent 1220 and inlet 703 at the bottom of the second column 700.

Figure 18:
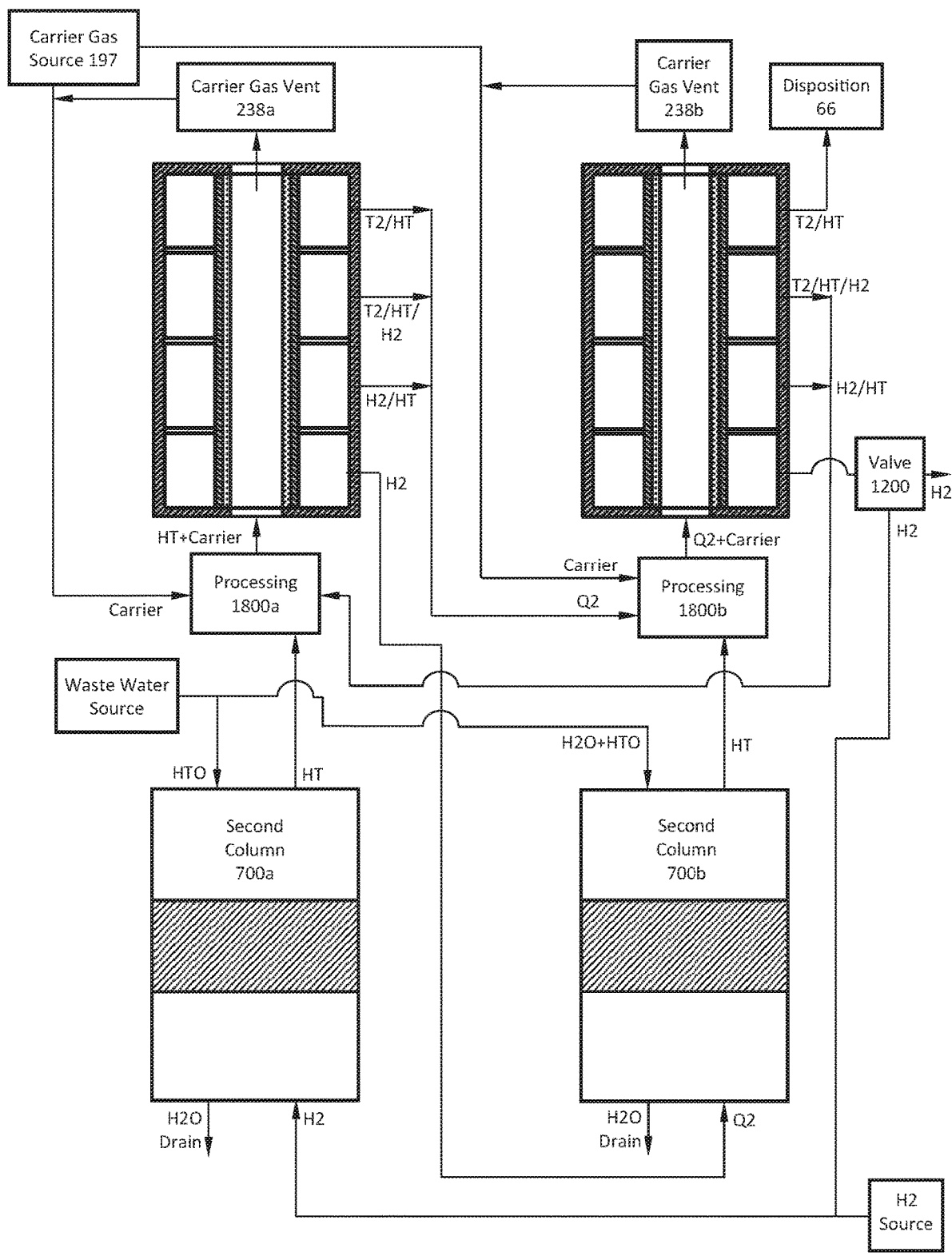
FIG. 18 depicts the system of FIG. 17 in series.

FIG. 18 depicts the system of FIG. 17 in series. The two APS modules function much like the series shown in FIG. 15.

Module 5—CCE

Many of these system elements are well known in the art of Tritium extraction and separation such as the electrolyzer disclosed as Module 1 in TRS systems A, B and C; the LPCE forward reaction as disclosed as Module 2 in systems A and D; the LPCE reverse extraction as disclosed as Module 3 in systems B, D and E; the APS element as disclosed as Module 4 in systems C, E and F; and one other extraction process has been anticipated, what is termed in the art as electrochemical extraction (ECE). ECE can be operated at low power to improve the transfer of hydrogen through a membrane. This approach operates in such a way that the transferred hydrogen is enriched in the heavier isotope, and the portion not transferred is enriched in the lighter isotope. By applying the pressure rise resulting from the transfer, tritium can be removed from hydrogen or deuterium.

In an embodiment, the electrochemical cell comprises the following features: two sides, with anode and cathode end plates, electrical connectors, and current carriers; a proton exchange membrane or polymer electrolyte membrane (PEM) in the middle, which in preferred embodiments comprises a solid polymer-based electrolyte; gas diffusion layers (GDL) comprising catalyst-coated porous conductors attached on either side of the PEM membrane, which together with PEM form a membrane electrode assembly (MEA); and a mechanical housing with a hydrogen feed point, a product outlet, and an outlet for excess hydrogen (raffinate), as well as appropriate internal flow paths for the fluids on either side of the MEA.

When a small electric potential (below 1.0 volt) is applied between the anode and the cathode and hydrogen is supplied to the electrochemical cell, hydrogen isotope separation occurs producing one stream of hydrogen enriched in the heavy isotope and one hydrogen stream depleted in the heavy isotope.

Without wishing to be limiting in any way, it is envisioned that using certain configurations of the electrochemical cells and methods described herein can provide one or more of the following beneficial features:

a. low electrical energy: unlike a water electrolysis cell, only a small amount of electrical energy may be needed to separate deuterium or tritium from protium;

b. only hydrogen gas and water are involved: there is no oxygen production according to the reactions carried out by the described electrochemical cells, and thus the use of oxygen sensitive and oxygen safety related materials is reduced or eliminated;

c. simultaneous enrichment and depletion: the described electrochemical cells can enrich one portion of a feed stream while depleting the other with deuterium or tritium simultaneously, which makes it easier for the cell to be used in reversible applications.

d. low or complete lack of electro-catalyst on the cathode side allows the cell to operate in isotope depletion mode with respect to the feed isotope concentration and may reduce significantly the cost of cell construction.

The electrochemical cell and methods of the present invention can, in certain embodiments, be used in the production of heavy water, e.g. for general use, or for use in the nuclear industry; be used in the detritiation of light water, for example as a means for waste remediation; be used in the enrichment or concentration of tritium, for example.

The electrochemical cell and methods of the present invention will now be described in further detail with reference to one non-limiting embodiment of the electrochemical cell, referred to herein as a Isotope Transfer Electrochemical Cell (ITEC).

Unlike the water electrolysis cells currently used for hydrogen isotope separation, the ITEC can operate at low cell voltages since the hydrogen transfer reaction employed is relatively more facile than the water decomposition reaction. As will be described in further detail below, the ITEC can also be used as an electrochemical compressor to pump a certain isotopic hydrogen gas to high pressures.

The principle of operation of the ITEC is that hydrogen is passed through a proton exchange membrane (PEM) under the influence of an electric current. The ITEC arrangement thus includes the cathode half of a PEM water electrolysis cell and anode half of a PEM fuel cell. The hydrogen is first oxidized on the inlet (anode) side of the membrane to protons which transfer to the cathode side through certain transport mechanisms and are reduced to re-form hydrogen gas. In an electrochemical compressor, the objective is for the electric current to produce the hydrogen at a higher pressure at the cathode than the anode side. In the ITEC, on the other hand, the objective is to preferentially transfer one of the hydrogen isotopes from the anode side to the cathode side of the cell. In practice, part of the feed stream to the anode passes through the membrane to the cathode and is enriched (or depleted if there is no catalyst on the cathode side) in one of the isotopes, with the remaining hydrogen from the feed stream being depleted in that isotope. The electrochemical process of transferring hydrogen through a PEM in this way requires no moving parts, uses materials that are well-developed and robust, and requires modest voltages and hence, power. Thus, this method of hydrogen isotope separation has the potential to be both practical and economical. Detailed discussion is further disclosed in patent application Low-Energy Electrochemical Separation of Isotopes, Ser. No. PCT/CA2014/000293 filed Mar. 28, 2014, with a priority date of Mar. 29, 2013, which is herein incorporated by reference in its entirety.

Figure 19:
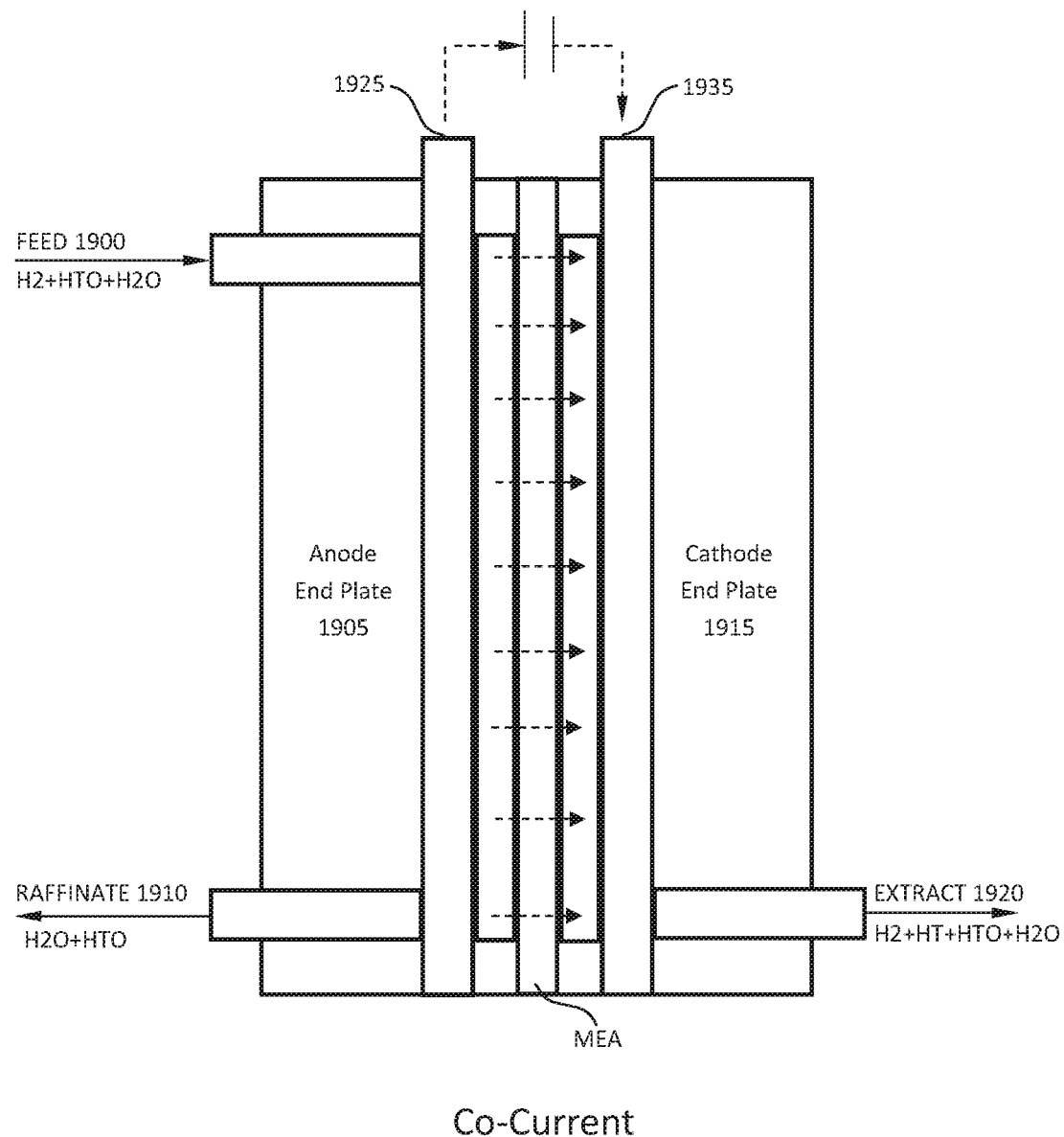
FIG. 19 depicts a co-current exchange cell.
Figure 20:
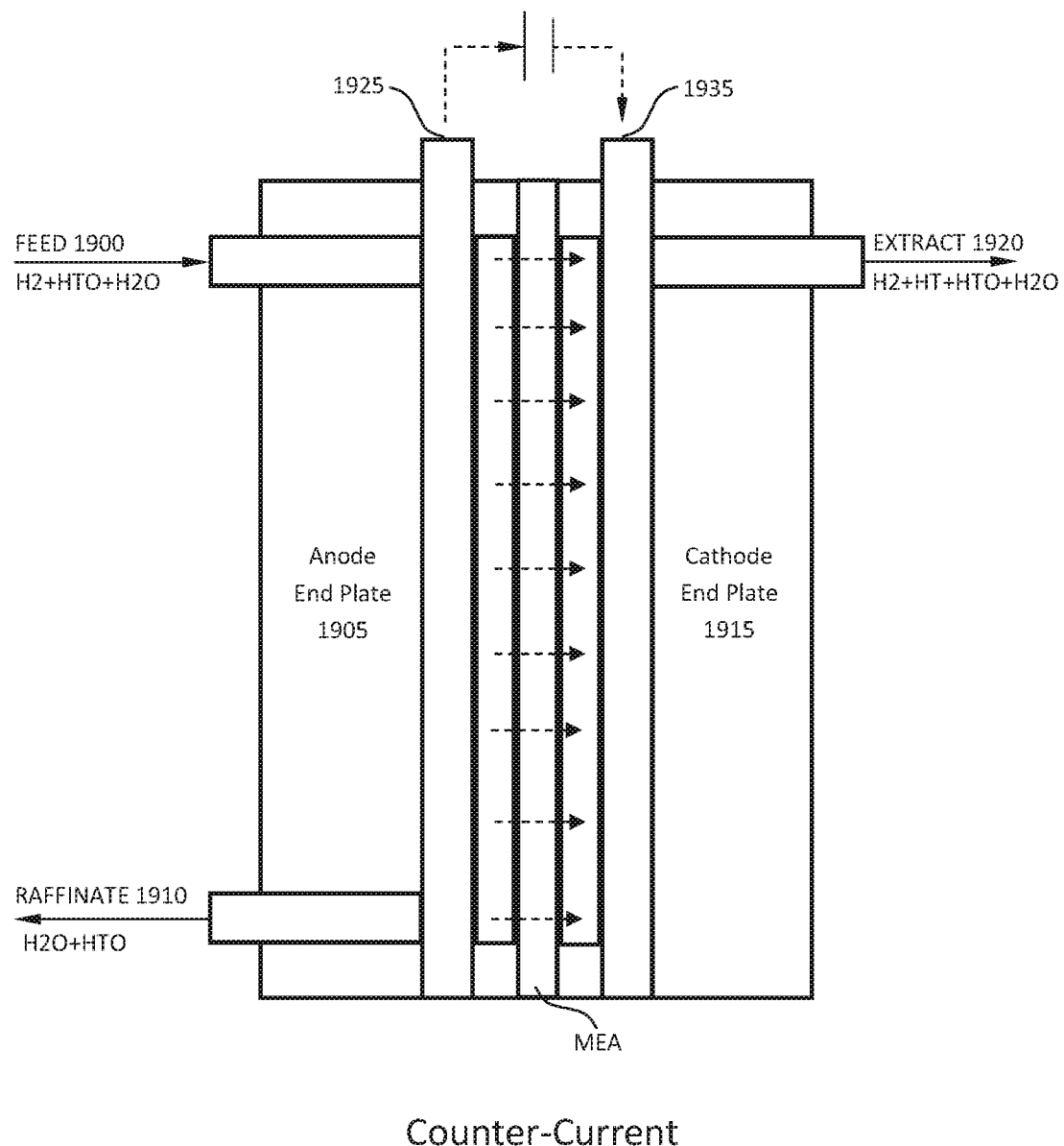
FIG. 20 depicts a counter-current exchange cell.
Figure 21:
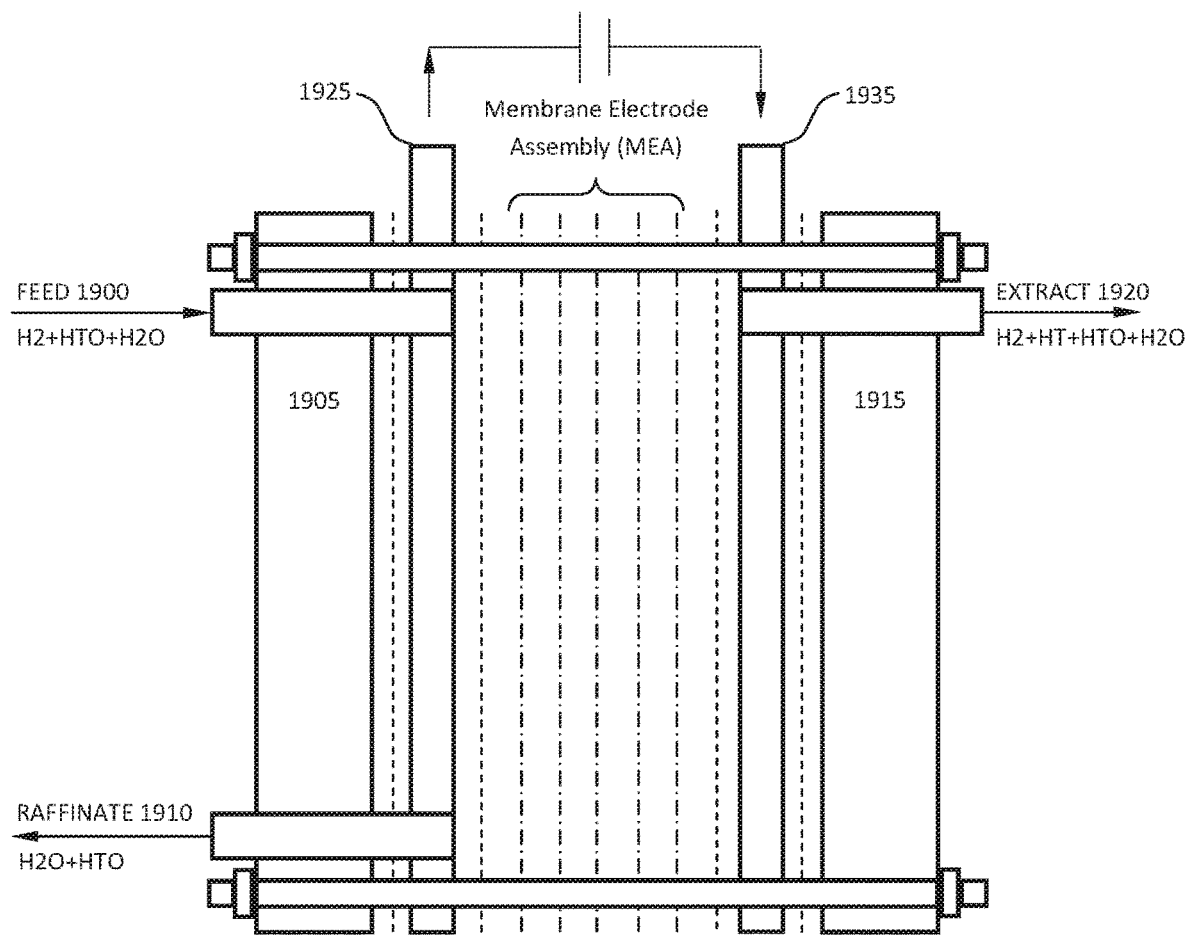
FIG. 21 depicts the counter-current exchange cell of FIG. 20 in more detail.

Single Cell Configuration:

FIGS. 19 through 21 depict the ITEC, hereafter referred to as CCE for either co-current or counter current exchange. FIG. 19 depicts a co-current CCE module, FIG. 20 depicts a counter-current CCE module, and FIG. 21 depicts the CCE of FIG. 20 in more detail. The schematic of a simple version of a CCE with internal components is shown in FIG. 21. The ITEC looks very similar to other types of PEM electrochemical cells. It has several layers of square or circular shaped components held together by a set of bolts along its perimeter. There are two separated sides in the cell: (i) anode side, where the hydrogen gas is fed and excess hydrogen leaves; and (ii) cathode side, where hydrogen gas is produced and possibly pumped to a higher pressure. The components of the illustrated cell design are described below:

1. End-plates and insulator: There are two flanges on the outer sides of the cell to hold everything together. These flanges serve as the end plates of the cell with openings for feed inlet 1900, extract outlet 1910, and raffinate outlet 1920. In the embodiment illustrated, the anode side flange and the cathode side flange is made of stainless steel. Other materials capable of withstanding pressure and electrochemical environment may also be used. There is a thin sheet in between the end plate and the electrical connector plate that provides insulation against electrical current from getting to the end plate.

2. Electrical connector plates: Next to the insulated thin sheet toward the center are the anode and cathode electrical connector plates 1925 and 1935, respectively, as shown in FIGS. 19 through 21. In the embodiment illustrated, they both are made of titanium or stainless steel or aluminum and are electrically insulated from the end-plates. The CCE is connected to an external direct current (DC) power source via these two plates.

3. Current carrier: These are titanium or stainless steel or aluminum based mesh, shaped according to the geometry of the cell active area that help carry current to the electrodes of the ITEC. The meshing also forms a pathway for humidified gas accessing the anode or discharging from the cathode during operation. Design and development of the current carrier is focused in reducing the resistance to electronic pathway, while maintaining adequate pathway for the hydrogen gas-water vapor mixture that reside behind the gas diffusion layer.

4. Electrode assembly. This is the combination of gas diffusion layer (GDL) and the catalyst layer available for the reaction. The constituents for this assembly could be the same on both anode and cathode sides, or different on either side depending on the nature of the isotopic separation required.

a) Gas diffusion layer (GDL): This has a layer of material that is permeable to gas and moisture; is electrically-conductive and; is partially hydrophobic (either blended or coated with water-repelling compound such as Teflon®). Often a type of carbon paper or carbon cloth is used as a GDL material. Other materials with similar properties can be used depending on the need to reduce electronic resistance, improve cell performance and reduce cost.

b) Catalyst: The catalyst in the form of carbon supported-platinum powder (other similar catalysts may be used primarily to reduce cost while maintaining performance) is mixed along with a polymer like Nafion® and sprayed or printed or coated on to the GDL to form the electrode assembly.

5. Proton exchange membrane or polymer electrolyte membrane (PEM) 1950: In this cell the electrolyte is in the form of a polymer that creates ionic transport paths when hydrated (brought in contact with water or water-vapor). Such membranes are commercially available, including membranes made from the polymer Nafion® with varying dry thicknesses available for use. In certain non-limiting embodiments, membranes made with DuPont Nafion® NR212, N115, N117 and N1110, or with sulphonated PEEK may be used. The membrane thicknesses when dry can vary, in some instances, from about 0.05 mm to about 0.25 mm. The membrane thickness changes when hydrated depending on its polymer's characteristic.

6. Membrane electrode assembly (MEA): This is a combination of the membrane with the anode and cathode electrode assemblies (GDL and catalyst layer combined), and can be made either as one integrated assembly by pressing them together at a certain temperature and pressure for an amount of time or by just arranging them in layers as shown in FIG. 21 and letting the pressure from the bolts hold these three layers together.

7. Gas and vapor flow inlet and outlets 1900, 1910, and 1920: There are three ports (made of plastic or stainless steel fittings) for the gas and vapor/liquid to enter and leave the cell:
   a) FEED: The feed contains hydrogen gas in isotopic equilibrium with water vapor or water. The moisture in the hydrogen is necessary to keep Nafion®-type membranes wet, which increases the proton conductivity, of the membranes. The feed stream enters the anode side of the cell through the inlet port 1900 as shown in FIG. 21. The actual feed flow rate and composition varies depending on the operating conditions.
   b) EXTRACT: The extract contains the isotopically enriched or depleted hydrogen gas and water vapor/water. This is the product stream that exits the cell on the cathode side as shown in FIG. 21. The hydrogen gas in the extract can be at elevated pressure.
   c) RAFFINATE: The raffinate contains the balance of feed, typically hydrogen gas and water vapor or water. It will contain the balance of the isotope not transferred to the extract. The raffinate stream exits the cell on the anode side as shown in FIG. 21.

Module 5 and System F

Figure 22:
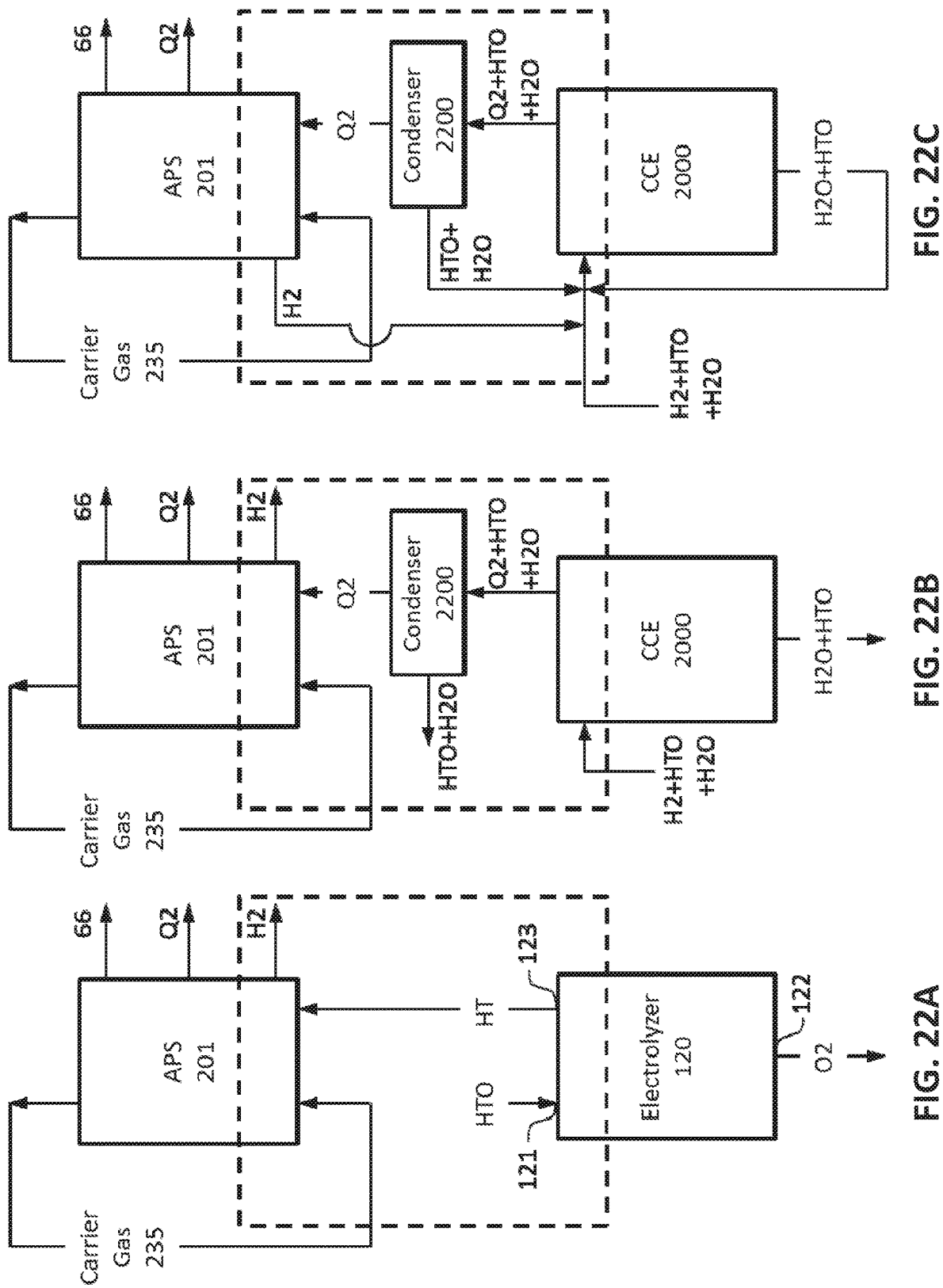
FIG. 22A depicts the system of FIG. 16A.
FIG. 22B depicts the system of FIG. 22A with the electrolyzer replaced by a CCE module.
FIG. 22C depicts the system of FIG. 22B in a near closed loop configuration.

FIG. 22 illustrates the natural evolution of the system following the substitution of the electrolyzer 120 of FIG. 14 with a CCE module 2000. FIG. 22A depicts the embodiment of FIG. 14 with the APS column 201 in a system with an electrolyzer 120. FIG. 22B depicts the substitution of the electrolyzer 120 with the CCE module 2000. Since the APS module 201 input is the same as the CCE module 2000 output the system can become a nearly closed loop as depicted in FIG. 22C.

Figure 23:
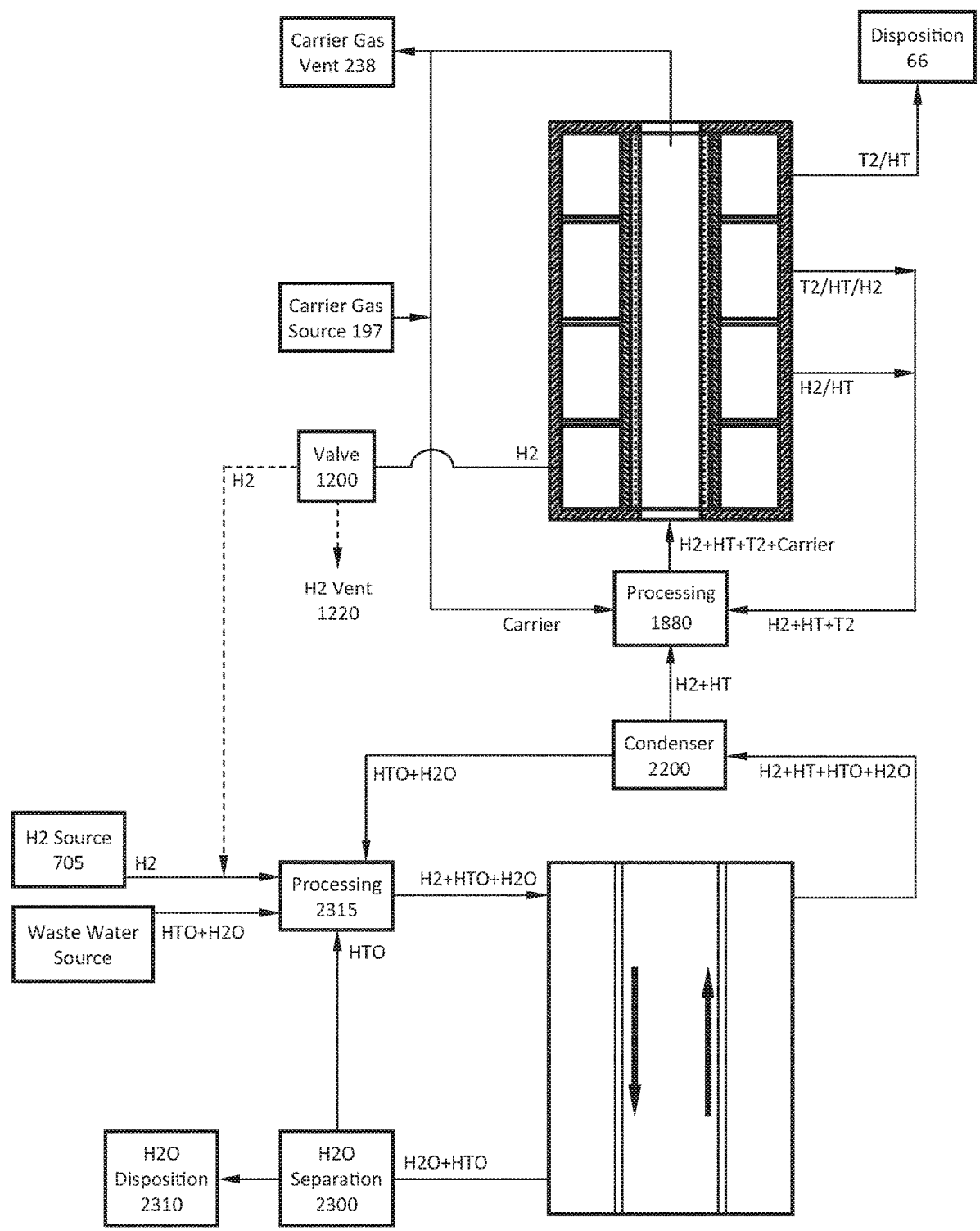
FIG. 23 depicts the system of FIG. 22C in more detail.

FIG. 23 depicts the system of FIG. 22C in more detail. The APS module 201 functions as shown and described in FIG. 14. The $H_2$ extracted from the APS module 201 can optionally be vented to atmosphere or collected at 1220, or it can be joined with $H_2$ source 705 and fed into the CCE module 2000. A processing step 1880 is added just prior to the APS module 201 wherein processing involves one or more of the following processes: heating, humidifying, drying, mixing, combining, and separation, among other things. The CCE module functions as shown and described in FIGS. 19 through 21.

Figure 24:
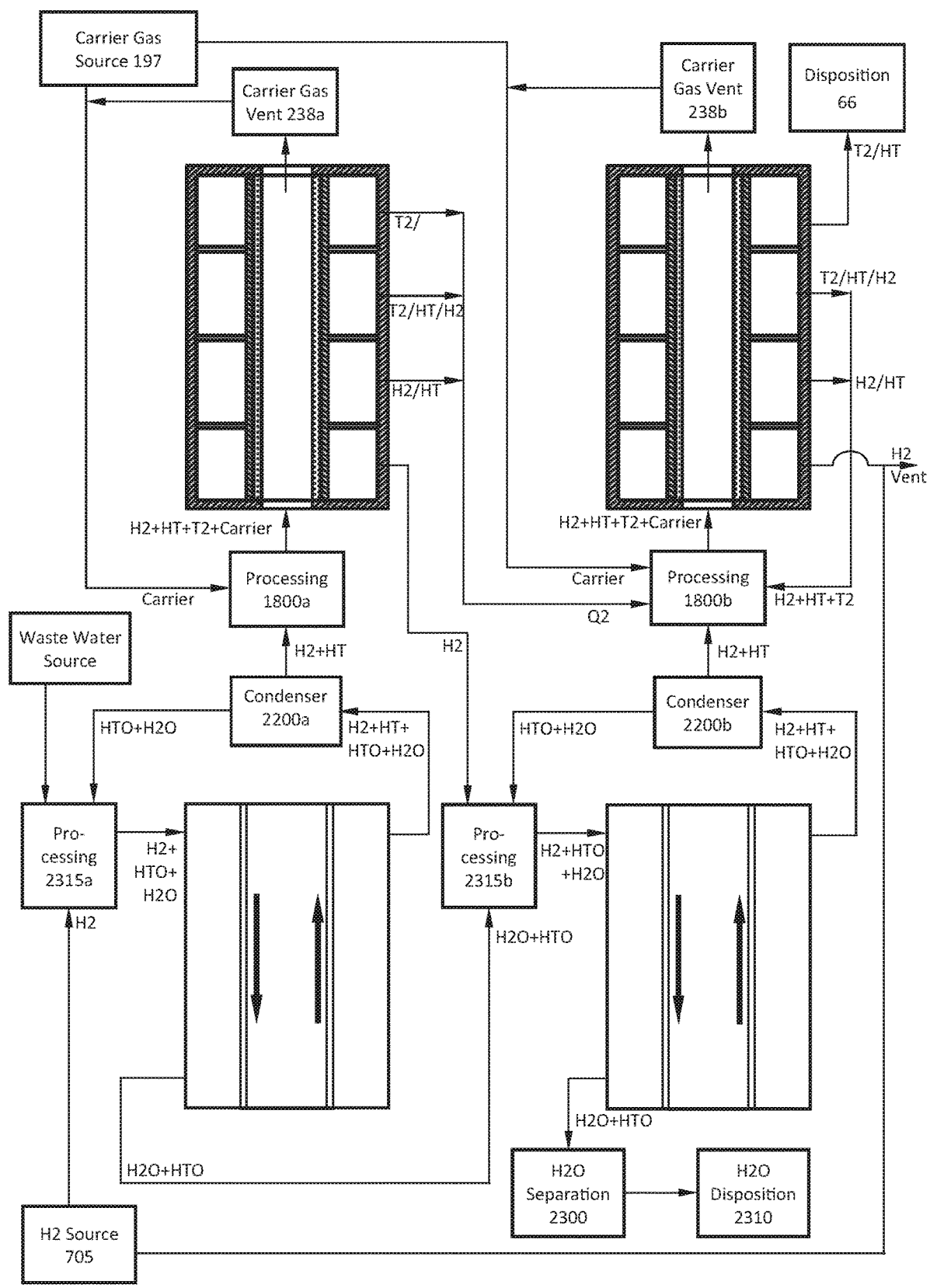
FIG. 24 depicts the system of FIG. 23 in series.

FIG. 24 depicts the system of FIG. 23 in series.

Process Variations

The present invention will be described in greater detail by way of specific examples of alternate embodiments. The following examples are offered for illustrative purposes only, and are not intended to limit the invention in any manner. Those of skill in the art will readily recognize a variety of noncritical parameters which can be changed or modified to yield essentially the same results. It should also be noted that heavy water, DTO, may replace HTO and the process will proceed according to the same equations.

HT Removal

In an embodiment of FIG. 12, if HT gas is required rather than HTO, then the HT gas can be removed at 1110. For every mole of HT gas removed, one mole of water ($H_2O$) has to be removed from the drain and additional 1 mole of $H_2$ gas must be added into the bottom of the second column 700 at inlet 703.

Further, if concentration of HT gas for a volume reduction operation is not desired, the process can be maintained at equilibrium through a removal step in the HT cycle. For every one mole of water ($H_2O$) diverted at drain and removed from the system, one mole of HT gas remains to either be catalyzed with one mole of water ($H_2O$) or can be removed from the system as HT gas. The removed HT gas can simply be compressed and transferred to an external processing facility or presented to a process designed to absorb the elemental hydrogen.

Catalysts

A variety of catalysts from various sources can be used at a variety of pressures, temperatures, gas flow rates, and molar ratios in order to establish the most efficient detritiation parameters. The preferred embodiment discloses a Teflon supported PGM catalyst, it should be understood the metal selected can be of a metal in the class of PGM, it may be mixed or alloyed with at least one other metal engineered specifically for process throughput. The hydrophobic coating as disclosed in the preferred embodiment is of polytetrafluoroethylene (PTFE); other coatings as discussed above can be used, it is well known that PTFE has improved life cycle characteristics over other coatings, but operates at lower conversion rates. It may be a desirable trade off of efficiency for life cycle in some embodiments.

Addition of Humidifiers, Dehumidifiers, Heaters and Pumps

In an effort to scale the extraction process:
   a. One or more humidifiers and/or dehumidifiers can be added ahead of or after the catalyst depending on where vapors are desired to be created and condensed.
   b. A humidifier and or heaters can be installed in the process as required, such as the hydrogen gas stream.
   c. One or more humidifiers or dehumidifiers may be added outside one or more of the columns at one or both ends depending on where vapors are desired to be created and condensed.
   d. Pumps, flow detectors, and valves can be added at points in the system, thereby establishing and maintaining a circulating profile through the system, resulting in a managed mass balance of circulating fractions.
   e. A variety of liquid and gas flow distributors can be used inside the columns to establish the most efficient flow distribution.

Alternate Configurations

A variety of configurations can be implemented, including but not limited to the connection and positioning of the two modules and module sizes as they relate to a variety of flow rates, molar ratios, and feed concentrations.

The above specification and examples provide a complete description of the structure and use of an exemplary embodiment. Although certain embodiments have been described above with a certain degree of particularity, or with reference to one or more individual embodiments, those skilled in the art could make numerous alterations to the disclosed embodiments without departing from the scope of this invention. As such, the illustrative embodiment of the present embodiment is not intended to be limited to the particular forms disclosed. Rather, they include all modifications and alternatives falling within the scope of the claims, and embodiments other than the ones shown may include some or all of the features of the depicted embodiments. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

In some embodiments one or more monitors or other sensors may be located at one or more of the system outlets. In some embodiments the one or more monitors or other sensors may be used to monitor for radioactive isotope content, such as tritium content, in the products to determine if they meet one or more predetermined levels such as environmental and operational levels or predetermined release criteria. In some embodiments one or more of the system products such as water and hydrogen are low purity e.g. they contain a percentage of one or more radioactive isotopes such as tritium wherein the percentage is typically in the range of 0.1% to 10% of the total tritium inventory.

The release of low purity products may be based upon environmental and/or operational levels considered allowable for the particular site and/or products types. In some embodiments tritiated water (e.g. $H_2O$ containing a percentage of HTO) and/or H2 gas (containing a percentage of HT) is released to the environment when it reaches a predetermined release criteria. Operational limits may be greater than or lower than release limits.

In some embodiments the products containing primarily radioactive isotopes such as tritium (e.g. $T_2$) may be low purity. In some embodiments the extracted tritium comprises at least one of the carrier gas, deuterium, and hydrogen gas. Tritiated gas removed from the system may be at least one of processed, stabilized, purified, and stored.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the invention as claimed.

In addition to the features described above, tiie present disclosure provides a mobile treatment system designed to be both transported and operated from a standard sized interniodal container for increased mobility between sites and on-site, modularity in the ability to perform multiple different waste water remediation processes within separate modules, and system scalabilty of adding multiple process-specific modules for quicker system process times required for a given project.

The mobile processing system as disclosed is designed to be both transported and operated from standard sized intermodal containers or custom designed enclosures for increased mobility between sites anti on-site, further increasing the speed and ease with which the system may be deployed. Additionally, the system is completely modular wherein the various different modules perform different forms of waste water remediation and may be connected in parallel and/or in series in order to perform all of the remediation requirements for any given site. A further advantage of the mobile processing system is the availability of additional modules for further processing of the contaminants removed from the water during the waste water remediation process(es) such that the contaminants do not need to be transported from the site for further processing prior to final disposition. An all-in-one mobile, modular waste water remediation and contaminant post-processing system is extremely advantageous for providing a complete solution for any given site, reducing transportation of hazardous materials, implementation costs, and overall complexity of standard existing practices.

In an embodiment, systems and methods are disclosed for utilizing modified transportable intermodal containers (one example: ISO containers) or custom designed containers (hereinafter all enclosure containers are referred to as skids unless otherwise specified) which contain components of various sub-systems of the processing system. Skids may remain on, and be operated from the trailers that were used for transporting the system to the treatment site, or they may be offloaded and placed adjacent each other or stacked. An example of an intermodal container for use with the system is a modified ISO shipping container; however, other containers that comply with regulations for conventional intermodal freight transport may be used.

In an embodiment, systems and methods are disclosed where the skids can be connected in a variety of configurations to provide different operating modes or capacities as required to process a particular nuclear process waste water. As mentioned, each skid consists of an enclosed, modified intermodal container, which is further configured with a drip pan and leak detection. Process lines between skids may consist of hoses with double containment for the prevention of spills to the environment.

As previously discussed, the MPS equipment is contained in intermodal containers or skids. Example containers are ISO shipping containers, which are widely used standardized containers that can be quickly and easily transported to sites around the world, as needed, on existing infrastructure including truck, rail, ship, plane, and other conventional industrial transportation mediums. Additionally, custom designed enclosures may be used. For purposes of this disclosure, the MPS container(s) is (are) hereinafter referred to as a skid or skids.

Each skid is modified or customized to hold the process equipment, allow for connection of interconnecting hoses, power and signal cables, and allow for removal of lids for filter and ISM vessels replacement. The skids may be operated while mounted on transport trailers. Elevated access platforms may be installed to allow disconnect of filters and ISM vessels for replacements, hydrogen venting, sampling, access to the control room, and placement of interconnecting hoses. Crane access will be required for routine operational replacement of solids removal filters, ultra filters, and ISM vessels. Alternatively, openings in the sidewalls of skids, with or without doors, may be provided to afford forklift, or equivalent, access to filters and ISM vessels for the purpose of routine operational replacement. Additionally, these skids can be mounted on, and operated from, trailers on site to be easily moved around, or rearranged, as needed. If custom designed containers are used, the resulting skid may have integral wheels and towing fixtures, thereby not relying on transport trailers for mobility. In addition to integral wheels, a custom designed skid may include a built in transport-power-source and vehicle operating controls, i.e. a skid that is drivable under its own power for purposes of mobility to and around the site. In some embodiments, the system will be implemented as a permanent installation on the site.

Modularity is a key aspect to effective, efficient, flexible, deployable remediation systems. Containing separate processes within separate modules allows for better remediation customization—allowing only the necessary processes to be brought on-site thus reducing shipping and process costs. At any time, processes may be added or removed allowing for a phased approach to site remediation. Mobile processing modules are simpler to transport, setup, and are more cost-efficient. Standard shipping sizes, such as intermodal containers, allow easy stacking for simple cost-effective transport. Modularity also allows for simpler setup, as processes may be set up in any configuration as required by the topography of the region, including stacking. Modularity also allows for easy skid replacement or simple phase out for skid maintenance. Each module is equipped with standard sized quick disconnects for quick and simple connection/disconnection between any skids in any configuration.

In an embodiment, the Control and Solids Feed skid 140 (FIGS. 7 and 19) houses the control system. This system utilizes an Allen-Bradley, or comparable, Compact Logix Programmable Logic Controller (PLC) to provide process logic for the entire system. The touchscreen HMI mounted to the face of the control panel provides access to the entire control system. However, the advanced logic allows a very simple start and stop to the process. This system provides both the local interface for monitoring and control operations at the control skid and also a remote control room interface for monitoring only. In addition to skid operational controls and interlocks, the control system provides date recording and reporting, radiation detection monitoring, and video camera monitoring for each skid. Operational space for the controls require one half of the available space of the physical skid. The other half houses the solids feed system as depicted in FIG. 7. In the depicted embodiment, the Control Skid is combined with the Solids Feed Skid to form the Control and Solids Feed Skid 140. In some embodiments, the Control Skid and the Solids Feed Skid are separate. Control may occur entirely on site, remotely, or both. On-site control may occur entirely within a Control Skid, within a combined Control and Solids Feed Skid 140, or it may be augmented with, either remote control from a remotely located control station or from mobile devices such as smart phones, tablets, and laptop computers.

In an embodiment, the five skids depicted in FIG. 1 can be arranged in five different operation modes that allow for flexibility in accommodating specific processing needs. In the depicted embodiment, control and solids feed functionalities are combined into a Control and Solids Feed Skid 140. In some embodiments there are six skids where the control and solids feed functionalities are split in a Control skid and a separate Solids Feed skid. Control may occur entirely on site, remotely, or both. On-site control may occur entirely within a Control skid or within a combined Control and Solids Feed Skid 140. Additionally, control may be augmented with one or more of remote control from a remotely located control station or from mobile devices such as smart phones, tablets, and laptop computers. The five operation modes are listed in Table 1. All operation modes are operated and monitored by a control system.

The embodiments of the invention in which an exclusive property or privilege is claimed are defined as follows:

1. A method for continuous low energy extraction of tritium from a tritiated source, comprising:
   transporting a first intermodal container including a first liquid phase catalytic exchange column to a site, the first liquid phase catalytic exchange column comprising a first catalyst, a first inlet, a second inlet, and a first outlet;
   transporting a second intermodal container including a second liquid phase catalytic exchange column to the site, the second liquid phase catalytic exchange column comprising a second catalyst, a third inlet, a fourth inlet, and a second outlet;
   transporting a third intermodal container including an electrolyzer to the site, the electrolyzer comprising an electrolyzer input and an electrolyzer output;
   using the first liquid phase catalytic exchange column, while supported by the first intermodal container, to:
     receive a first hydrogen (first H2) gas from the first inlet,
     receive the tritiated source from the second inlet, wherein the tritiated source comprises a first concentration of tritiated water,
     use the first catalyst to exchange protium ions in the first H2 gas with tritium ions in the tritiated source to yield tritiated hydrogen (HT) gas at the first outlet and a second concentration of tritiated water, wherein the second concentration of tritiated water is less than the first concentration of tritiated water,
     monitor tritium content of the second concentration of tritiated water with a first tritium monitor for a first predetermined level, and
     responsive to detecting the first predetermined level, release the second concentration of tritiated water to the second liquid phase catalytic exchange column,
   using the second liquid phase catalytic exchange column, while supported by the second intermodal container, to:
     receive the HT gas from the first outlet via the third inlet,
     receive the second concentration of tritiated water from the fourth inlet,
     use the second catalyst to exchange tritium ions in the HT gas with protium ions in the second concentration of tritiated water to yield a second H2 gas from a second outlet and a third concentration of tritiated water, wherein the third concentration of tritiated water is greater than the second concentration of tritiated water,
     monitor the tritium content of the third concentration of tritiated water with a second tritium monitor for a second predetermined level, and
     responsive to detecting the second predetermined level, release the third concentration of tritiated water to the first liquid phase catalytic exchange column, and
   using the electrolyzer, while supported by the third intermodal container, to:
     receive a portion of the third concentration of tritiated water at the electrolyzer input, split the third concentration of tritiated water into HT gas and oxygen gas, and release the HT gas from the electrolyzer output to the third inlet.

2. The method of claim 1, wherein the exchange of protium ions with tritium ions in the first liquid phase catalytic exchange column occurs at a first temperature, a first pressure, and a first flow rate the exchange tritium ions with protium ions in the second liquid phase catalytic exchange column occurs at a second temperature, a second pressure, and a second flow rate.

3. The method of claim 2, wherein the first temperature is in the range of 80° C.

4. The method of claim 2, wherein the first pressure and second pressure are in the range of 5 to 20 atmospheres.

5. The method of claim 1, wherein the first catalyst includes at least one of a first volume of hydrophobic exchange media and a first volume of hydrophilic exchange media.

6. The method of claim 5, wherein the first volume of hydrophobic exchange media is at least one of equal to and greater than a second volume of hydrophobic exchange media.

7. The method of claim 5, wherein the first volume of hydrophilic exchange media is at least one of equal to and greater than a second volume of hydrophilic exchange media.

8. The method of claim 1, wherein the first liquid phase catalytic exchange column is operably configured to distribute a first volume of liquid through a first liquid distributor and is configured to distribute a second volume of liquid through a second liquid distributor.

9. The method of claim 8, wherein the first volume of a liquid is distributed at a first rate, and wherein the second volume of liquid is distributed at a second rate, wherein the first rate is at least one of equal to and greater than the second rate.

10. The method of claim 1, wherein the second H2 gas at the second outlet is received by the first liquid phase catalytic exchange column.

11. A method for continuous low energy extraction of tritium from a tritiated source, the method comprising:

transporting a first intermodal container including at least one of a first liquid phase catalytic exchange column, a second liquid phase catalytic exchange column, and an electrolyzer;

transporting a second intermodal container including at least another of the first liquid phase catalytic exchange column, the second liquid phase catalytic exchange column, and the electrolyzer;

using the first liquid phase catalytic exchange column, while supported by one of the first intermodal container and the second intermodal container, to
receive a first hydrogen (H2) gas and the tritiated source,
exchange protium ions in the first H2 gas with tritium ions in the tritiated source, and
yield tritiated hydrogen (HT) gas at a first outlet and a first concentration of tritiated water at a second outlet;

monitoring tritium content of the first concentration of tritiated water with a first tritium monitor for a first predetermined level, responsive to detecting the first predetermined level, transferring the first concentration of tritiated water from the second outlet to at least one of the second liquid phase catalytic exchange column, the electrolyzer, and a first drain;

using the electrolyzer to
receive a portion of the first concentration of tritiated water at an electrolyzer input,
split the first concentration of tritiated water into HT gas and oxygen gas, and
release the HT gas from an electrolyzer output, using the second liquid phase catalytic exchange column, while supported by one of the first intermodal container and the second intermodal container, to
receive the HT gas from the first outlet of the first liquid phase catalytic exchange column and the electrolyzer output,
exchange protium ions of the first concentration of tritiated water with tritium ions in the HT gas, and
yield a second H2 gas at a third outlet and a second concentration of tritiated water at a fourth outlet;

monitoring tritium content of the second concentration of tritiated water with a second tritium monitor for a second predetermined level, responsive to detecting the second predetermined level, transferring the second concentration of tritiated water from the fourth outlet of the second liquid phase catalytic exchange column to at least one of the first liquid phase catalytic exchange column and a second drain.

12. The method of claim 11, wherein the second concentration of tritiated water is greater than the first concentration of tritiated water.

13. The method of claim 11, wherein the second H2 gas at the third outlet is received by the first liquid phase catalytic exchange column.

14. The method of claim 11, wherein the exchange of protium ions with tritium ions in the first liquid phase catalytic exchange column occurs at a first temperature, a first pressure, and a first flow rate and the exchange of protium ions with tritium ions in the second liquid phase catalytic exchange column occurs at a second temperature, a second pressure, and a second flow rate.

15. The method of claim 14, wherein the first temperature is in the range of 80° C. to 140° C. and the second temperature is in the range of 20° C. to 60° C.

16. The method of claim 14, wherein the first pressure and second pressure are in the range of 5 to 20 atmospheres.

17. The method of claim 11, wherein the first catalyst includes at least one of a first volume of hydrophobic exchange media and a first volume of hydrophilic exchange media.

18. The method of claim 17, wherein the first volume of hydrophobic exchange media is at least one of equal to and greater than a second volume of hydrophobic exchange media.

19. The method of claim 17, wherein the first volume of hydrophilic exchange media is at least one of equal to and greater than a second volume of hydrophilic exchange media.

20. The method of claim 1, wherein the first liquid phase catalytic exchange column and second liquid phase catalytic exchange column each have a top end and a bottom end.

21. The method of claim 20, wherein the first inlet and third inlet are each located on the bottom end of the first liquid phase catalytic exchange column and the second liquid phase catalytic exchange column, respectively, and the second inlet and first outlet, and the fourth inlet and second outlet, each are located on the top end of the first liquid phase catalytic exchange column and the second liquid phase catalytic exchange column, respectively.

22. The method of claim 11, wherein
the first liquid phase catalytic exchange column and second liquid phase catalytic exchange column each have a top end and a bottom end,
the first outlet and third outlet are each located on the top end of the first liquid phase catalytic exchange column and second liquid phase catalytic exchange column, respectively, and
the second outlet and fourth outlet are each located on the bottom end of the first liquid phase catalytic exchange column and second liquid phase catalytic exchange column respectively.

23. The method of claim 1, further comprising conveying the tritiated water and the hydrogen gas through the first liquid phase catalytic exchange column and the second liquid phase catalytic exchange column in a continuous closed loop process.

24. The method of claim 11, wherein the second liquid phase catalytic exchange column houses the electrolyzer and wherein releasing the HT gas from the electrolyzer output includes directing the HT gas from the second liquid phase catalytic exchange column.

25. The method of claim 1, further comprising transporting a heater on a fourth intermodal container and combining heated water vapor from the heater with the second H2 gas.

26. The method of claim 1, further comprising releasably coupling at least one of the first intermodal container, the second intermodal container, and the third intermodal container to a fourth intermodal container, the fourth intermodal container housing a control system configured to operate at least one of the processes of the first liquid phase catalytic exchange column and the second liquid phase catalytic exchange column.

27. The method of claim 1, wherein
the first liquid phase catalytic exchange column is disposed in the first intermodal container,
the second liquid phase catalytic exchange column is disposed in the second intermodal container, and
the electrolyzer is disposed in the third intermodal container.

28. The method of claim 11, wherein
the first liquid phase catalytic exchange column is disposed in one of the first intermodal container and the second intermodal container,
the second liquid phase catalytic exchange column is disposed in one of the first intermodal container and the second intermodal container.

29. The method of claim 11, wherein the electrolyzer is disposed in a third intermodal container.

* * * * *